US011459128B2

(12) United States Patent
Keller et al.

(10) Patent No.: US 11,459,128 B2
(45) Date of Patent: Oct. 4, 2022

(54) FOLDABLE TUBE WITH UNITARY HINGE DEVICES, SYSTEMS, AND METHODS

(71) Applicant: Roccor, LLC, Longmont, CO (US)

(72) Inventors: Philip Keller, Berthoud, CO (US); William Francis, Lyons, CO (US); Tayler Thomas, Boulder, CO (US); Thomas Murphey, Fort Collins, CO (US); Todd Whitaker, Boulder, CO (US)

(73) Assignee: Roccor, LLC, Longmont, CO (US)

( * ) Notice: Subject to any disclaimer, the term of this patent is extended or adjusted under 35 U.S.C. 154(b) by 172 days.

(21) Appl. No.: 16/598,013

(22) Filed: Oct. 10, 2019

(65) Prior Publication Data

US 2020/0223563 A1  Jul. 16, 2020

Related U.S. Application Data

(63) Continuation of application No. PCT/US2018/026870, filed on Apr. 10, 2018.
(Continued)

(51) Int. Cl.
*B64G 1/22* (2006.01)
*B64G 1/44* (2006.01)

(52) U.S. Cl.
CPC ............ *B64G 1/222* (2013.01); *B64G 1/44* (2013.01)

(58) Field of Classification Search
CPC . B64G 1/222; B64G 1/44; B64G 1/66; B64G 9/00; B64G 1/443; E04C 3/005;
(Continued)

(56) References Cited

U.S. PATENT DOCUMENTS 3,670,358 A 6/1972 Schwartz
6,343,442 B1 * 2/2002 Marks .................... B64G 1/222
244/172.6
(Continued)

FOREIGN PATENT DOCUMENTS

WO  WO 2018/191256  10/2018

OTHER PUBLICATIONS

International Search Report and Written Opinion, International Appl. No. PCT/US18/026870, dated Jul. 9, 2018, USPTO/ISA.
(Continued)

*Primary Examiner* — Medhat Badawi
*Assistant Examiner* — Vicente Rodriguez
(74) *Attorney, Agent, or Firm* — Wilson Patent Law, LLC

(57) ABSTRACT

Methods, systems, and devices for foldable tube with unitary hinge are provided in accordance with various embodiments. Some embodiments include a device that may include one or more foldable tube sections configured to facilitate the deployment of an object with respect to an end portion of at least one of the one or more foldable tube sections; each of the one or more foldable tube sections may include one or more unitary hinge regions. The unitary hinge regions may include one or more longitudinal hinge regions configured to enable folding that is transverse to a primary axis of a respective foldable tube section. The unitary hinge regions may include a lateral hinge region configured to enable flattening that is parallel to a primary axis of a respective foldable tube section. Some embodiments may include a wire harness disposed within an interior portion of one or more foldable tube sections.

18 Claims, 26 Drawing Sheets

Related U.S. Application Data

(60) Provisional application No. 62/483,489, filed on Apr. 10, 2017.

(58) Field of Classification Search
CPC .. E04C 2003/0421; E04H 12/00; E04H 12/18
See application file for complete search history.

(56) References Cited

U.S. PATENT DOCUMENTS

| | | | | |
|---|---|---|---|---|
| 7,009,578 B2* | 3/2006 | Nolan | ............... | H01Q 1/08 343/897 |
| 8,434,196 B1* | 5/2013 | Murphey | ............. | H01Q 15/161 16/225 |
| 9,444,394 B1* | 9/2016 | Thomas | ............... | H02S 20/20 |
| 2002/0056248 A1* | 5/2002 | Warren | ............... | E04C 3/291 52/648.1 |
| 2003/0182879 A1* | 10/2003 | Warren | ............... | E04C 3/005 52/108 |
| 2010/0163684 A1* | 7/2010 | Dando | ............... | E05D 1/02 244/172.6 |
| 2012/0146880 A1* | 6/2012 | Behrens | ............... | B64G 1/222 343/895 |
| 2013/0186011 A1* | 7/2013 | Keller | ............... | H02S 20/00 52/108 |
| 2014/0007377 A1 | 1/2014 | Masini | | |

OTHER PUBLICATIONS

Marks, G.W. et al., "The Lightweight Deployable Antenna for the MARSIS Experiment on the Mars Express Spacecraft," Proceedings of the 36th Aerospace Mechanisms Symposium, Glenn Research Center, May 14-17, 2002.

Mobrem, M. et al., "Analysis of the Lenticular Jointed MARSIS Antenna Deployment," 47th AIAA/ASME/ASCE/AHS/ASC Structures, Structural Dynamics, and Materials Conference, May 1-4, 2006, Newport Rhode Island, pp. 1-13.

* cited by examiner

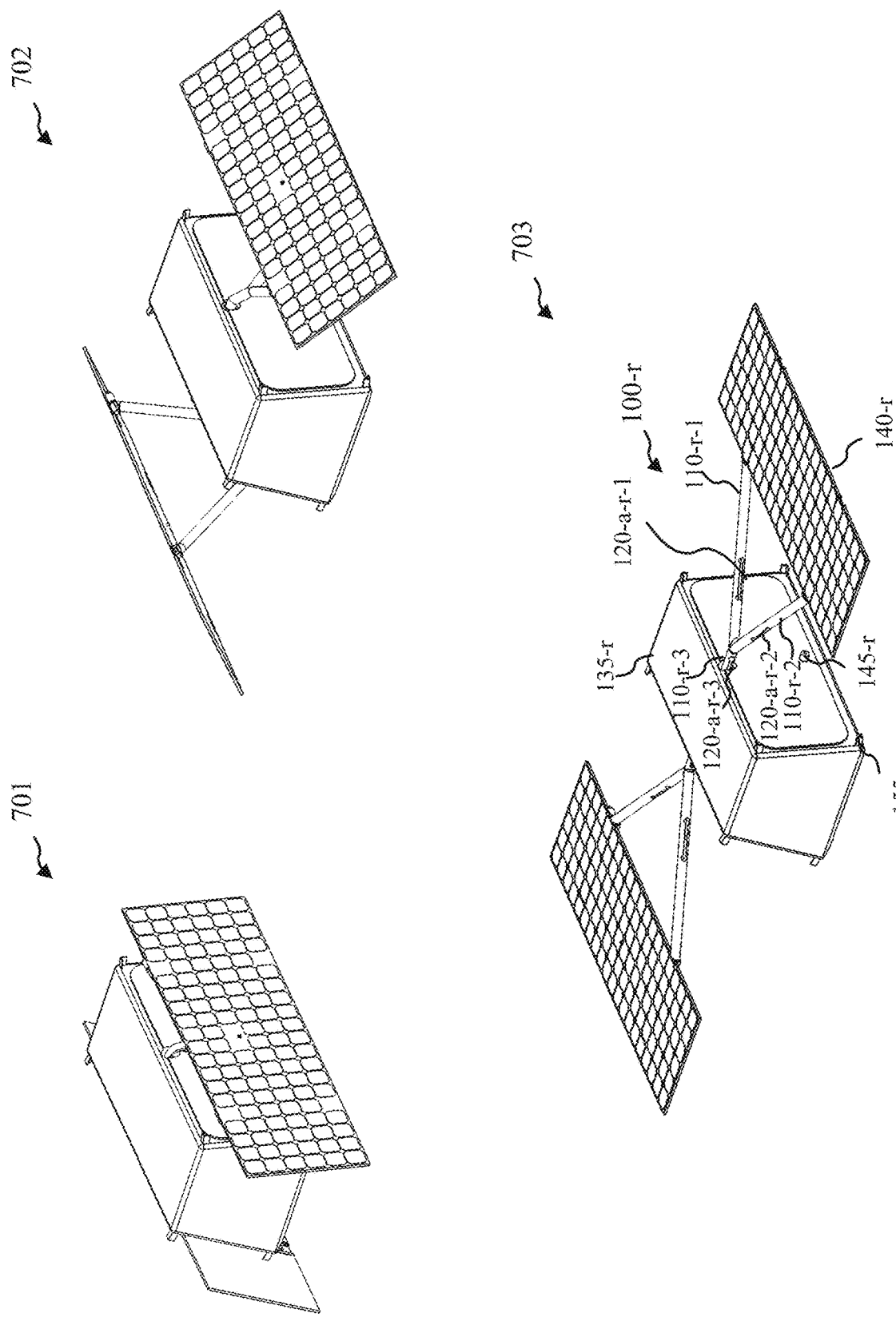

1100

Fold one or more foldable tube sections with respect to one or more longitudinal unitary hinge regions of the one or more foldable tube sections to stow the one or more foldable tube sections — 1110

FIG. 11A

FOLDABLE TUBE WITH UNITARY HINGE DEVICES, SYSTEMS, AND METHODS

BACKGROUND

Solar arrays and other components have a wide variety of applications, including providing power for spacecraft. Storing, launching, and deploying solar arrays and other components for space and/or terrestrial applications, however, may involve different issues, such as weight and volume constraints, exposure to extreme temperatures, and/or spacecraft maneuvering loads. There may be a need for new tools and techniques to address storage and/or deployment for solar arrays and other components.

SUMMARY

Methods, systems, and devices for foldable tube with unitary hinge are provided in accordance with various embodiments. For example, some embodiments include a device that may include one or more foldable tube sections configured to facilitate the deployment of an object with respect to an end portion of at least one of the one or more foldable tube sections; each of the one or more foldable tube sections may include one or more unitary hinge regions.

In some embodiments, the one or more foldable tube sections include a composite material with multiple layers; the multiple layers may include one or more carbon fiber layers. In some embodiments, at least one of the unitary hinge regions includes a longitudinal hinge region configured to enable folding that may be transverse to a primary axis of a respective foldable tube section. The longitudinal hinge region may include at least a portion of the one or more carbon fiber layers. Some embodiments include one or more circumferential bands proximal to the longitudinal hinge region. The one or more circumferential bands may be formed from one or more composite material layers. In some embodiments, the longitudinal hinge region includes two or more apertures configured to allow the respective foldable tube section to fold and to flatten at least a portion of the longitudinal hinge region.

In some embodiments, the one or more foldable tube sections are fabricated to compress along at least a portion of the one of the more foldable tube sections different from the longitudinal hinge region. At least one of the unitary hinge regions may include a lateral hinge region configured to enable flattening that is parallel to a primary axis of a respective foldable tube section. In some embodiments, the lateral hinge region includes one or more layers devoid of carbon fibers.

In some embodiments, the longitudinal hinge region includes one or more relief slots oriented around a circumference of a respective foldable tube section. The one or more relief slots may allow the longitudinal hinge region to self-buckle.

Some embodiments may include a wire harness disposed within an interior portion of at least one of the one or more foldable tube sections. The wire harness may include one or more reduced regions configured to coincide with one or more of the respective longitudinal unitary hinge regions. The wire harness may be configured to at least fold or flex laterally in a region of the one or more foldable tube sections other than the longitudinal hinge region. The wire harness may include one or more relief slots.

In some embodiments, a first foldable tube section from the one or more foldable tube sections is configured to stack with a second foldable tube section from the one or more foldable tube sections when at least one of the one or more unitary hinge regions is folded and the first foldable tube section and the second foldable tube section are compressed.

In some embodiments, the one or more foldable tube sections form a yoke configuration; the yoke configuration may include two foldable tube sections from the one or more foldable tube sections that form two arm portions and one foldable tube section that forms a base portion. In some embodiments, each of the two arm portions includes one or more unitary hinge regions and the base portion includes one or more unitary hinge regions. The two arm portions and the base portion may be configured to avoid overlapping when the one or more unitary hinges regions are folded.

In some embodiments, the one or more foldable tube sections are fabricated to compress to provide a kickoff spring functionality for deployment of the one or more foldable tube sections.

Some embodiments include one or more tube interfaces coupled with one or more end portions of at least one of the one or more foldable tube sections. The deployed object may include one or more solar panels coupled with at least one of the one or more foldable tube sections utilizing at least one of the one or more tube interfaces.

Some embodiments include one or more saddle components configured to constrain at least one of the one or more foldable tube sections during at least a folding or a compressing of the one or more foldable tube sections.

Some embodiments include a method that may include folding one or more foldable tube sections with respect to one or more longitudinal unitary hinge regions of the one or more foldable tube sections to stow the one or more foldable tube sections; the one or more foldable tube sections may be configured to facilitate the deployment of an object with respect to an end portion of at least one of the one or more foldable tube sections.

Some embodiments of the method include compressing the one or more foldable tube sections with respect to one or more longitudinal portions of the one or more foldable tube sections to further stow the one or more foldable tube sections. Some embodiments include deploying the one or more foldable tube sections through decompressing the one or more compressed longitudinal portions of the one or more foldable tube sections and unfolding the one or more foldable tube sections with respect to the one or more longitudinal unitary hinge regions.

In some embodiments of the method, at least folding or compressing the one or more foldable tube sections stacks the one or more longitudinal portions of the one or more foldable tube sections. In some embodiments, folding the one or more foldable tube sections avoids overlapping one or more longitudinal portions of the one or more foldable tube sections. In some embodiments, compressing the one or more foldable tube sections provides a kickoff spring functionality for deploying the one or more foldable tube sections. In some embodiments, compressing the one or more foldable tube sections includes flattening the one or more foldable tube sections with respect to one or more lateral unitary hinge regions. In some embodiments, deploying the one or more foldable tube sections includes deploying the object coupled with the end portion of at least one of the one or more foldable tube sections.

Some embodiments of the method include utilizing one or more relief slots of a respective longitudinal unitary hinge region to allow for over rotation of the longitudinal unitary hinge region during deployment. Some embodiments include utilizing one or more circumferential bands proximal to at least one of the one or more longitudinal unitary hinge regions.

Some embodiments of the method include utilizing a wire harness disposed within an interior portion of at least one of the one or more foldable tube sections. Some embodiments include constraining one or more portions of the one or more tube sections during at least the folding or the compressing utilizing one or more saddle components.

In some embodiments of the method, the one or more foldable tube sections include a composite material with multiple layers; the multiple layers may include one or more carbon fiber layers. In some embodiments, the one or more longitudinal unitary hinge regions include two or more apertures configured to allow the respective foldable tube section to fold and to flatten at least a portion of the respective longitudinal unitary hinge region. In some embodiments, the one or more lateral unitary hinge regions include one or more layers devoid of carbon fibers. In some embodiments, the one or more relief slots allow the longitudinal hinge region to self-buckle. In some embodiments, the wire harness includes one or more reduced regions configured to coincide with one or more of the longitudinal unitary hinge regions. In some embodiments, the wire harness is configured to at least fold or flex laterally in a region of the one or more foldable tube sections other than the one or more longitudinal unitary hinge regions. In some embodiments, the wire harness includes one or more relief slots. In some embodiments, the deployed object includes one or more solar panels coupled with at least one of the one or more foldable tube sections utilizing at least one of the one or more tube interfaces.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 7B shows a deployment sequence of a system in accordance with various embodiments.

FIG. 11A shows a flow diagram of a method in accordance with various embodiments.

DETAILED DESCRIPTION

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Systems, devices, and methods for foldable tube with unitary hinge region are provided in accordance with various embodiments. The foldable tube with unitary hinge region may be applicable for deployment of solar panels on satellites, for example. In some embodiments, the foldable tube with unitary hinge region may include a portion of one or more deployable boom components. Some embodiments include unitary design aspects that may eliminate a need for moving mechanical hinge parts for tube folding. Some embodiments include tube or boom compression that may eliminate need for a separate kick-off spring. Some embodiments include integrated saddle aspects that may provide for support and alignment. Some embodiments include wire harness integration into the foldable tube components. Some embodiments include composite laminate design for the tube components.

Figure 1A:
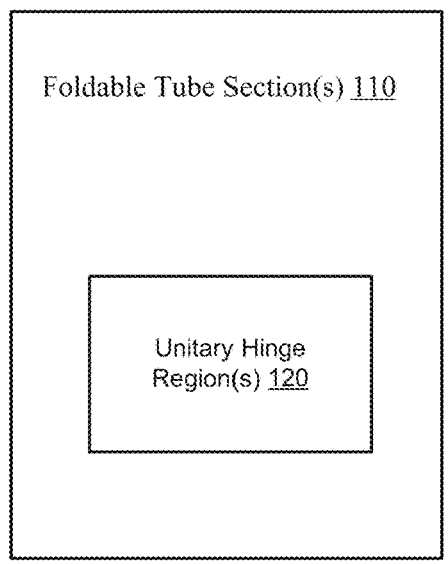
FIG. 1A shows a device in accordance with various embodiments.

Turning now to FIG. 1A, a device 100 is provided in accordance with various embodiments. Device 100 may include one or more foldable tube sections 110 configured to facilitate the deployment of an object with respect to an end portion of at least one of the one or more foldable tube sections 110; each of the one or more foldable tube sections 110 may include one or more unitary hinge regions 120. In some embodiments, device 100 may be referred to as a deployable boom device. Some embodiments may refer to device 100 as a deployable strut device. Some embodiments may include other components with the device 100.

In some embodiments, the one or more foldable tube sections 110 include a composite material with multiple layers; the multiple layers may include one or more carbon fiber layers. In some embodiments, at least one of the unitary hinge regions 120 includes a longitudinal hinge region configured to enable folding that is transverse to a primary axis of a respective foldable tube section 110. The longitudinal hinge region may be referred to as a longitudinal unitary hinge region. The longitudinal hinge region may include at least a portion of the one or more carbon fiber layers. Some embodiments include one or more circumferential bands proximal to the longitudinal hinge region. The one or more circumferential bands may be formed from one or more composite material layers. In some embodiments, the longitudinal hinge region includes two or more apertures configured to allow the respective foldable tube section to fold and to flatten at least a portion of the longitudinal hinge region.

In some embodiments, the one or more foldable tube sections 110 are fabricated to compress along at least a portion of the one of the more foldable tube sections 110 different from the longitudinal hinge region. At least one of the unitary hinge regions may include a lateral hinge region configured to enable flattening that is parallel to a primary axis of a respective foldable tube section 110. In some embodiments, the lateral hinge region includes one or more layers devoid of carbon fibers. The lateral hinge region may be referred to as a lateral unitary hinge region.

In some embodiments, the longitudinal hinge region includes one or more relief slots oriented around a circumference of a respective foldable tube section 110. The one or more relief slots may allow the longitudinal hinge region to self-buckle.

Some embodiments may include a wire harness disposed within an interior portion of at least one of the one or more foldable tube sections 110. The wire harness may include one or more reduced regions configured to coincide with one or more of the respective unitary hinge regions 120, such as a respective longitudinal unitary hinge region. The wire harness may be configured to at least fold or flex laterally in a region of the one or more foldable tube sections other than the longitudinal hinge region. The wire harness may include one or more relief slots.

In some embodiments, a first foldable tube section from the one or more foldable tube sections 110 is configured to stack with a second foldable tube section from the one or more foldable tube sections 110 when at least one of the one or more unitary hinge regions 120 is folded and the first foldable tube section and the second foldable tube section are compressed.

In some embodiments, the one or more foldable tube sections 110 form a yoke configuration; the yoke configuration may include two foldable tube sections from the one or more foldable tube sections 110 that form two arm portions and one foldable tube section that forms a base portion. In some embodiments, each of the two arm portions includes one or more unitary hinge regions 120 and the base portion includes one or more unitary hinge regions 120. The two arm portions and the base portion may be configured to avoid overlapping when the one or more unitary hinge regions 120 are folded. The one or more unitary hinge regions 120 may include longitudinal unitary hinge regions.

In some embodiments, the one or more foldable tube sections 110 are fabricated to compress to provide a kickoff spring functionality for deployment of the one or more foldable tube sections 110.

Some embodiments include one or more tube interfaces coupled with one or more end portions of at least one of the one or more foldable tube sections 110. The deployed object may include one or more solar panels coupled with at least one of the one or more foldable tube sections utilizing at least one of the one or more tube interfaces. Other deployed objects may include, but are not limited to, synthetic aperture array panel, sensors, and/or structural members. Some embodiments may include a deployed object that may be thermally isolated utilizing the device 100.

Some embodiments include one or more saddle components configured to constrain at least one of the one or more foldable tube sections 110 during at least a folding or a compressing of the one or more foldable tube sections 110.

Figure 1B:
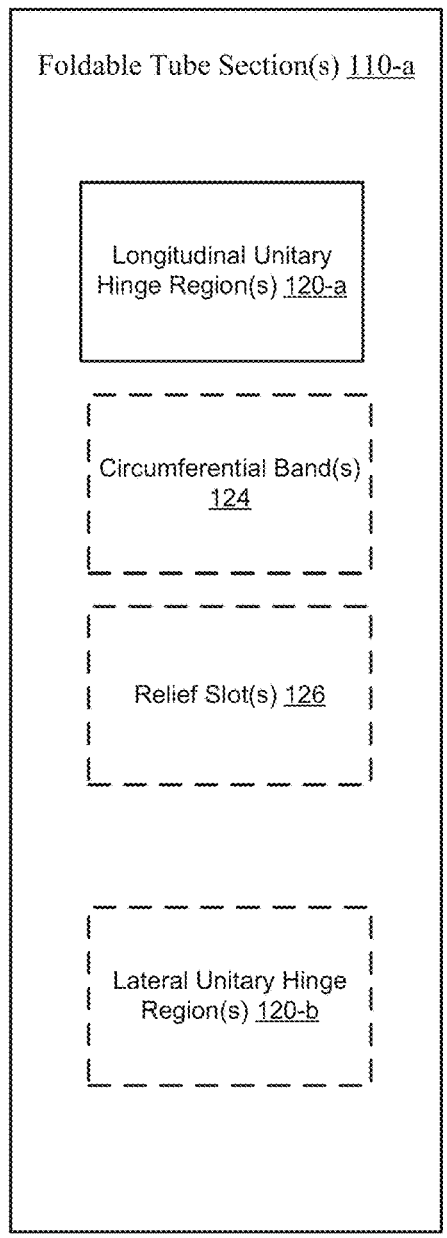
FIG. 1B shows a device in accordance with various embodiments.

FIG. 1B shows a device 100-*a* in accordance with various embodiments. Device 100-*a* may be an example of device 100 of FIG. 1A. Device 100-*a* may include one or more foldable tube sections 110-*a* configured to facilitate the deployment of an object with respect to an end portion of at least one of the one or more foldable tube sections 110-*a*; each of the one or more foldable tube sections 110-*a* may include one or more unitary hinge regions 120, which may include one or more longitudinal unitary hinge regions 120-*a* and/or one or more lateral unitary hinge regions 120-*b*. The one or more longitudinal unitary hinge regions 120-*a* may be referred to as longitudinal hinge regions; the one or more lateral unitary hinge regions 120-*b* may be referred to as lateral hinge regions.

In some embodiments, the one or more foldable tube sections 110-*a* include a composite material with multiple layers; the multiple layers may include one or more carbon fiber layers. In some embodiments, the one or more longitudinal unitary hinge regions 120-*a* may be configured to enable folding that is transverse to a primary axis of a respective foldable tube section 110-*a*. The longitudinal unitary hinge region 120-*a* may include at least a portion of the one or more carbon fiber layers. Some embodiments include one or more circumferential bands 124 proximal to the longitudinal unitary hinge regions 120-*a*. The one or more circumferential bands 124 may be formed from one or more composite material layers. The one or more circumferential bands may help prevent damage to the one or more foldable tube sections 110-*a* and the one or more unitary hinge regions 120, such as the longitudinal unitary hinge region 120-*a* and/or lateral unitary hinge region 120-*b*, during deployment. The composite material may include a variety of materials with high strain capability, including but not limited to, a glass weave and/or a carbon fiber construction.

In some embodiments, the one or more longitudinal unitary hinge regions 120-*a* includes two or more apertures configured to allow the respective foldable tube section 110-*a* to fold and to flatten at least a portion of the longitudinal unitary hinge region 120-*a*.

In some embodiments, the one or more foldable tube sections 110-*a* are fabricated to compress along at least a portion of the one of the more foldable tube sections 110-*a* different from the longitudinal unitary hinge region 120-*a*. For example, some embodiments include one or more lateral unitary hinge regions 120-*b* configured to enable flattening that is parallel to a primary axis of a respective foldable tube section 110-*a*. In some embodiments, the lateral unitary hinge region 120-*b* includes one or more layers devoid of carbon fibers.

In some embodiments, the one or more longitudinal hinge unitary regions 120-*a* includes one or more relief slots 126 oriented around a circumference of a respective foldable tube section 110-*a*. The one or more relief slots 126 may allow the longitudinal unitary hinge region 120-*a* to self-buckle. The one or more relief slots 126 may allow folding of the longitudinal unitary hinge region 120-*a* without damage, such as during stowage and/or during deployment events.

Some embodiments of device 100-*a* include a first foldable tube section from the one or more foldable tube sections 110-*a* that may be configured to stack with a second foldable tube section from the one or more foldable tube sections 110-*a* when at least one of the one or more longitudinal unitary hinge regions 120-*a* is folded and the first foldable tube section and the second foldable tube section are compressed, which may utilize the one or more lateral unitary hinge regions 120-*b* in some cases.

In some embodiments, the one or more foldable tube sections 110-*a* form a yoke configuration; the yoke configuration may include two foldable tube sections from the one or more foldable tube sections 110-*a* that form two arm portions and one foldable tube section that forms a base portion. In some embodiments, each of the two arm portions includes one or more longitudinal unitary hinge regions 120-*a* and the base portion includes one or more longitudinal unitary hinge regions 120-*a*. The two arm portions and the base portion may be configured to avoid overlapping when the one or more longitudinal unitary hinges regions 120-*a* are folded.

In some embodiments, the one or more foldable tube sections 110-*a* are fabricated to compress to provide a kickoff spring functionality for deployment of the one or more foldable tube sections 110-*a*.

Figure 1C:
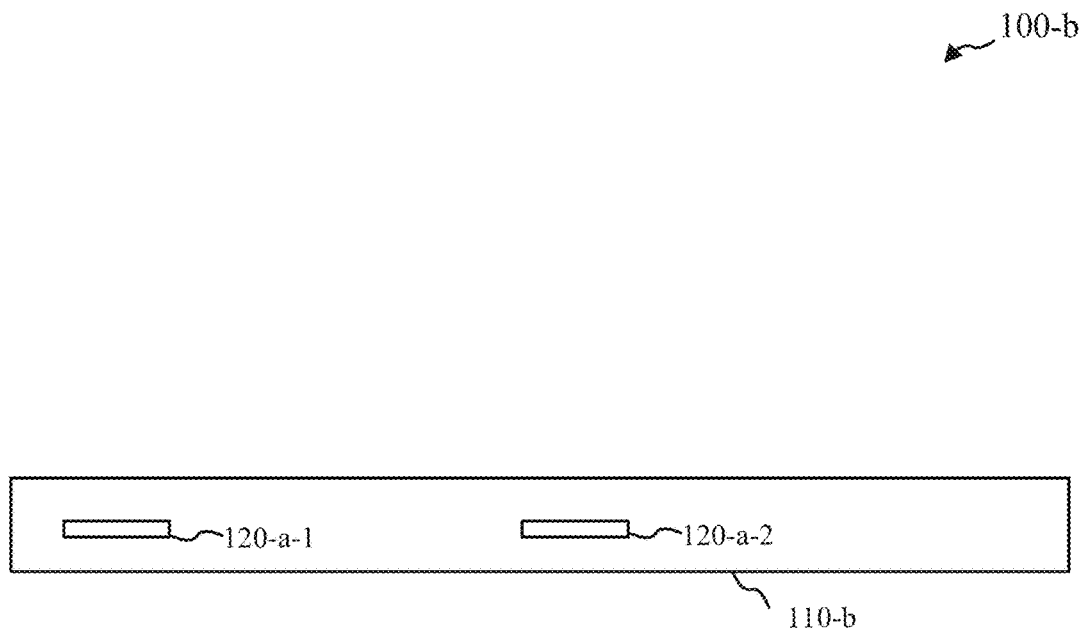
FIG. 1C shows a device in accordance with various embodiments.
Figure 1D:
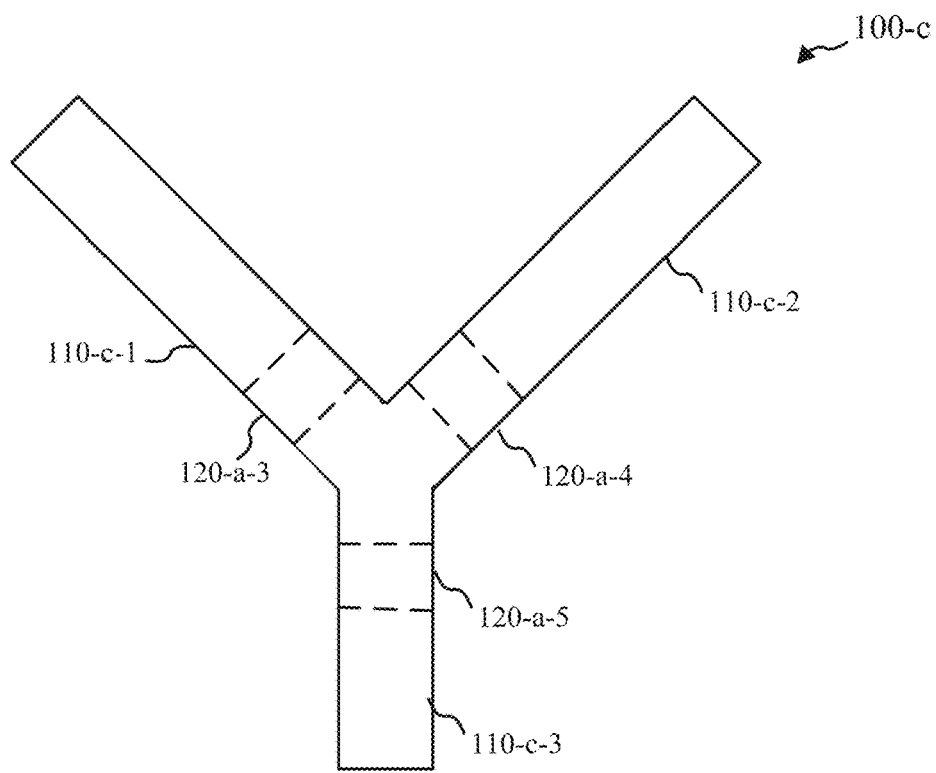
FIG. 1D shows a device in accordance with various embodiments.

FIG. 1C and FIG. 1D provide devices 100-*b* and 100-*c*, respectfully, that are shown in accordance with various embodiments. Devices 100-*b* and 100-*c* may be examples of device 100 of FIG. 1A and/or device 100-*a* of FIG. 1B. Device 100-*b* may include foldable tube section 110-*b* and two or more longitudinal unitary hinge regions 120-*a*-1 and 120-*a*-2. The device 100-*b* may be fabricated from a composite material as may the two or more hinge regions 120-*a*-1 and 120-*a*-2. In some embodiments, the two or more longitudinal unitary hinge regions 120-*a*-1, 120-*a*-2 include two or more apertures configured to allow the foldable tube section 110-*b* to fold at each respective unitary hinge region 120-*a*-1, 120-*a*-2 and to flatten at least a portion of each hinge region. In some embodiments, the foldable tube section 110-*b* is fabricated to compress along at least a portion of the foldable tube section 110-*b* different from the one or more unitary hinge regions 120-*a*-1, 120-*a*-2. Some embodiments may utilize one or more lateral unitary hinge regions to facilitate compressing and/or flattening of the foldable tube section 110-*b*.

Device 100-*c* may include multiple foldable tube sections 110-*c*-1, 110-*c*-2, 110-*c*-3 that may include a yoke configuration; the yoke configuration may include two arm portions 110-*c*-1, 110-*c*-2 and one base portion 110-*c*-3. Each of the two arm portions 110-*c*-1, 110-*c*-2 may include one or more longitudinal unitary hinge regions 120-*a*-3, 120-*a*-4, respectively, and the base portion 110-*c*-3 includes one or more longitudinal unitary hinge regions 120-*a*-5. The two arm portions 110-*c*-1, 110-*c*-2 and the base portion 110-*c*-3 may be configured to avoid overlapping when the one or more unitary hinge regions 120-*a*-3, 120-*a*-4, 120-*a*-5 may be folded. Some embodiments may utilize one or more lateral unitary hinge regions to facilitate compressing and/or flattening of the foldable tube sections 110-*c*-1, 110-*c*-2, 110-*c*-3.

Figure 1E:
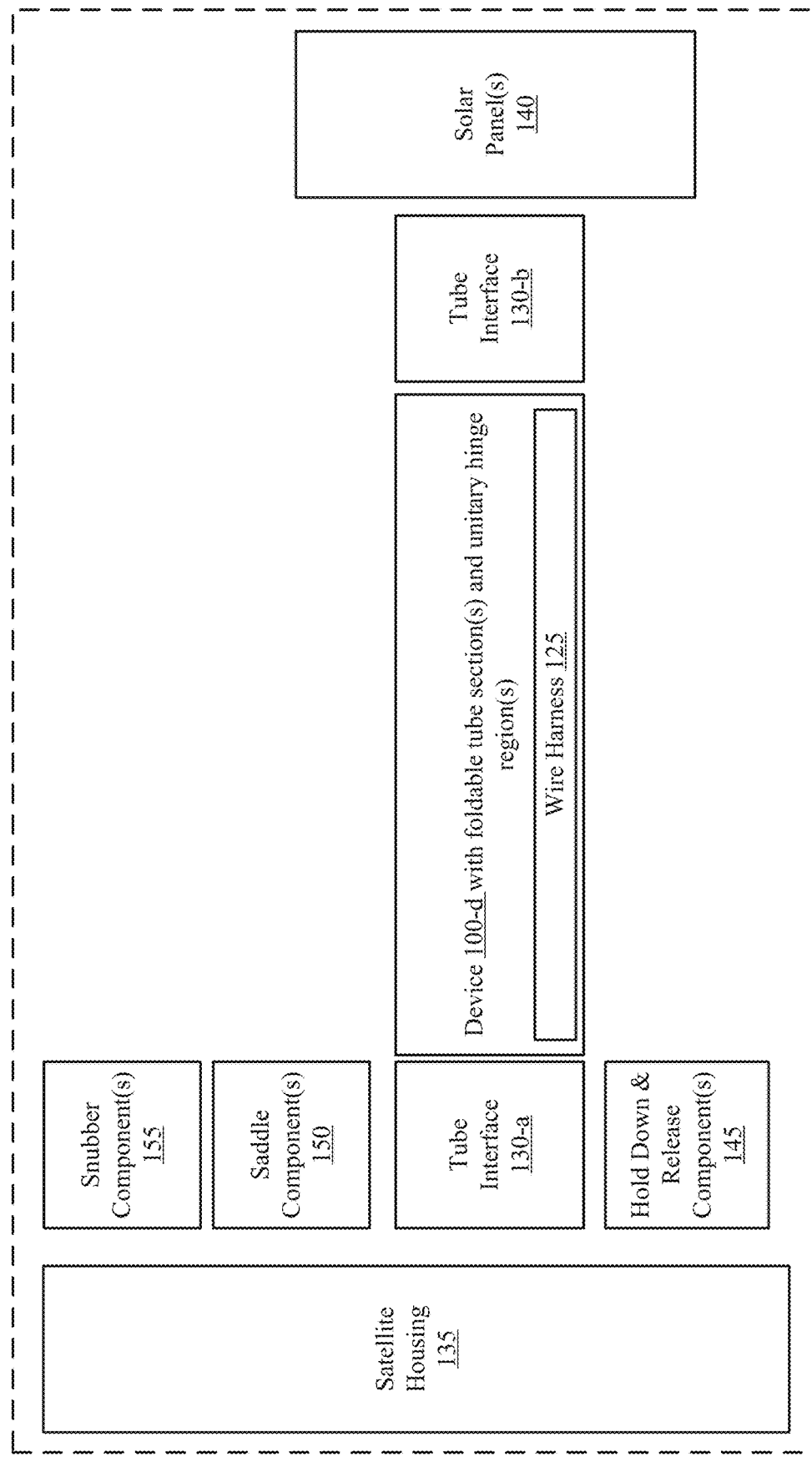
FIG. 1E shows a system in accordance with various embodiments.

FIG. 1E shows an example of a system 101 in accordance with various embodiments. System 101 may include a device 100-*d* as described with respect to device 100 of FIG. 1A, device 100-*a* of FIG. 1B, device 100-*b* of FIG. 1C, and/or device 100-*c* of FIG. 1D. For example, system 101 may include device 100-*d* with one or more foldable tube sections that may include one or more unitary hinge regions. System 101 may also include: snubber component(s) 155; saddle component(s) 150; and/or hold down and release component(s) 145; these components may facilitate stowage and/or deployment of different objects, such as solar panels 140. In some embodiments, system 101 may include a wire harness 125; the wire harness 125 may be configured to fit in a variety of ways through device 100-*d*, such as through the use of reduced regions, foldable and/or flexible portions, and/or relief slots. Tube interface 130-*a* may be utilized to couple the device 100-*d* with a satellite housing 135 or other components. System 101 may include tube interface 130-*b* that may be utilized to couple the device 100-*d* with one or more deployable components, such as solar panels 140, for example. The components of system 101 may be coupled with each other in a variety of ways; other embodiments may include more or fewer components.

Figure 2A:
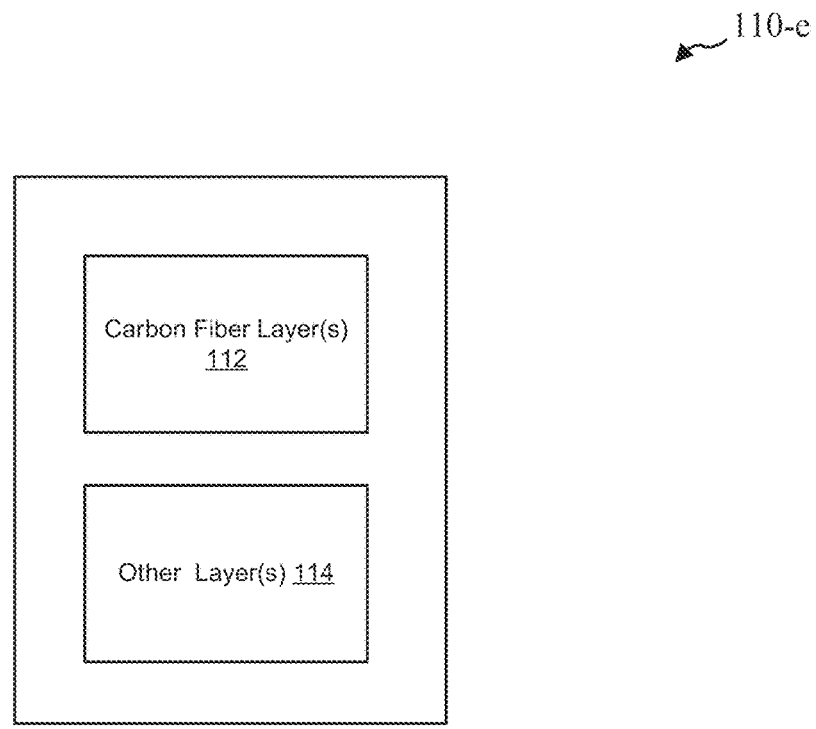
FIG. 2A shows a device in accordance with various embodiments.

Turning now to FIG. 2A, aspects of a foldable tube section 110-*e* are provided in accordance with various embodiments. Foldable tube section 110-*e* may be an example of aspects of device 100 of FIG. 1A, device 100-*a* of FIG. 1B, device 100-*b* of FIG. 1C, device 100-*c* of FIG. 1D, and/or device 100-*d* of FIG. 1E. For example, foldable tube section 110-*e* may include one or more carbon fiber layers 112 and/or one or more other layers 114, which may include layers that may not include carbon fibers, for example. In general, the foldable tube section 110-*e* may form a composite structure with different layers, which may depend on the different desired functionality of different portions of the foldable tube section 110-*e*. Examples of other layers may include fiberglass layers, Kevlar layers, and/or quartz fiber layers. Layers 112 and/or 114 may utilize materials with high strain capability in some embodiments. In some embodiments, layer(s) 114 may be constructed utilizing carbon fibers that may all be aligned in one direction to form a structure that may provide the functionality provided with layers that may be devoid of carbon fibers, which may provide for flattening of a lateral unitary hinge region, for example.

In general, the multiple layer structure of foldable tube section 110-*e* may involve one or more laminate or reinforcement layers. The laminate layers of foldable tube section 110-*e* may vary along the length and/or circumference of the foldable tube section 110-*e*. Laminate layers may be fabricated to include a laminate constructed from one or more layers of laminable material. In some embodiments, the process of creating a laminate may include impregnating or applying an adherent material with respect to one or more layers of laminable material. Sufficient heat or pressure, or both, may be applied to the one or more layers of laminable materials and the adherent material to produce the laminate. For example, in some embodiments, heat may be applied in a range of between about 10 degrees centigrade ("° C.") to about 400° C. and pressure may be applied in a range of between about 15 absolute pounds per square inch ("psi") to about 50,000 psi depending upon the composition, number, thickness, size, porosity, or other factors relating to the one or layers of laminable materials; the source of pressure (whether vacuum pressure, atmospheric pressure, mold pressure, or the like); or the source of heat (whether applied directly through a mold, or indirectly from a remote heat source). Some embodiments may utilize other temperature and/or pressure ranges. Merely by way of example, some embodiments may utilize pressures of less than 15 psi; some embodiments may use pressures below 10 psi or below 5 psi. For example, some embodiments may utilize approximately 1 psi of pressure.

In some embodiments, the one or more layers of laminable material may be used to produce the laminate layers that may be in the form of discrete or woven fibers including or consisting of, as illustrative examples: boron carbide fibers, silicon carbide fibers, alumina fibers, alumina titanium fibers, carbon fibers, para-aramid fibers such as KEVLAR®, polypropylene such as INNEGRA®, a ultra-high molecular weight polyethylene such as DYNEEMA® or SPECTRA®, s-glass, e-glass, polyester, or the like, or combinations thereof.

In some embodiments, the one or more layers of laminable material may be coated or impregnated with an amount of adherent material having suitable mechanical characteristics, including or consisting of, as illustrative examples: a phenolic, an epoxy, a polyethylene a terephtalate, a vinylester, bismaleimide/diallybisphenol A, a cyanate ester, a nylon, a polypropylene, polyethylene terephthalate, polyethersulfone, polyetheretherketone, acrylonitrile butadiene styrene, a polyamide, a polyethylene, a thermoplastic urethane, or the like, which can be either catalytically or thermally set, or combinations thereof.

Figure 2B:
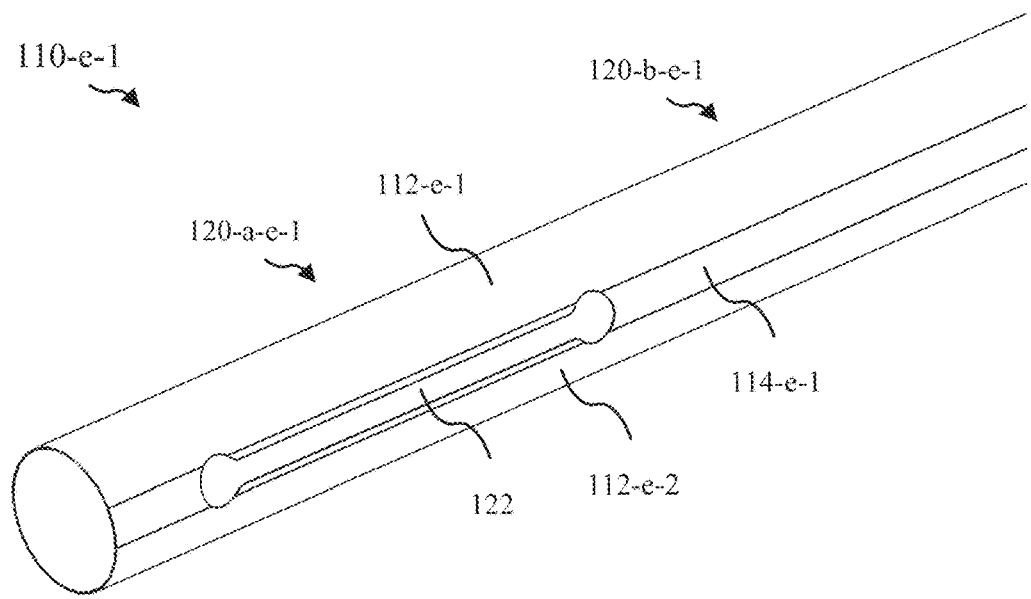
FIG. 2B shows a device in accordance with various embodiments.

For example, FIG. 2B shows a foldable tube section 110-*e*-1 with a longitudinal unitary hinge region 120-*a*-*e*-1 and one or more lateral unitary hinge regions 120-*b*-*e*-2 in accordance with various embodiments. Foldable tube section 110-*e*-1 may be an example of foldable tube section 110-*e* of FIG. 2A. The one or more lateral unitary hinge regions 120-*b*-*e*-1 may include one or more layers 114-*e*-1 that is devoid of carbon fibers; for example, the layer 114-*e*-1 may include a fiberglass layer. The longitudinal unitary hinge regions 120-*a*-*e*-1 may include one or more layers 112-*e*-1, 112-*e*-2 that include carbon fibers along with one or more apertures 122. The layers 112-*e*-1, 112-*e*-2 may not extend all the way around the circumferential cross-section of the foldable tube section 110-*e*-1. This may facilitate providing high strain capability for portions of the foldable tube section 110-*e*-1, while allowing for the flattening of the foldable tube section 110-*e*-1 with respect to the lateral unitary hinge regions 120-*b*-*e*-1 that include layer 114-*e*-1 that may be devoid of carbon fibers. The longitudinal unitary hinge region 120-*a*-*e*-1 may be configured to enable folding that is transverse to a primary axis of the foldable tube section 110-*e*-1; aperture 122 may be configured to allow the foldable tube section 110-*e*-1 to fold and to flatten at least a portion of the longitudinal unitary hinge region 120-*a*-*e*-1. Device 100-*e*-1 may be fabricated to compress along at least a portion of the foldable tube section 110-*e*-1 different from the longitudinal hinge region 120-*a*-*e*-1, such as with respect to the lateral unitary hinge region 120-*b*-*e*-1, which may be configured to enable flattening that is parallel to a primary axis of the foldable tube section 110-*e*-1.

Figure 2C:
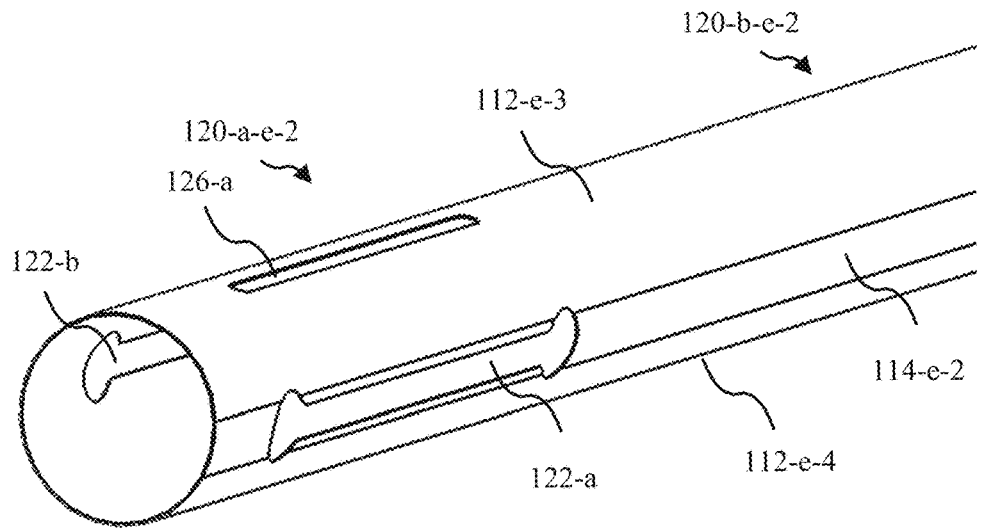
FIG. 2C shows a device in accordance with various embodiments.

FIG. 2C shows another foldable tube section 110-*e*-2 with one or more longitudinal unitary hinge regions 120-*a*-*e*-2 and one or more lateral unitary hinge regions 120-*b*-*e*-2 in accordance with various embodiments. Foldable tube section 110-*e*-2 may be an example of foldable tube section 110-*e* of FIG. 2A. The one or more lateral unitary hinge regions 120-*b*-*e*-2 may include one or more layers 114-*e*-2 that may be devoid of carbon fibers, while the longitudinal unitary hinge regions 120-*a*-*e*-2 may include one or more layers that include carbon fibers 112-*e*-3, 112-*e*-4 along with one or more apertures 122-*a*, 122-*b*. Foldable tube section 110-*e*-2 may also include one or more relief slots 126-*a*, which may be considered as part of the longitudinal unitary hinge region 120-*a*-*e*-2. The one or more relief slots 126-*a* may allow for the longitudinal unitary hinge region 120-*a*-*e*-2 to self-buckle. The one or more relief slots 126-*a* may be oriented periodically around the circumference of the foldable tube section 110-*e*-2 in the longitudinal unitary hinge region 120-*a*-*e*-2, which may allow for folding without damage (e.g. during manual stowage and/or during over-deployment events).

Figure 2D:
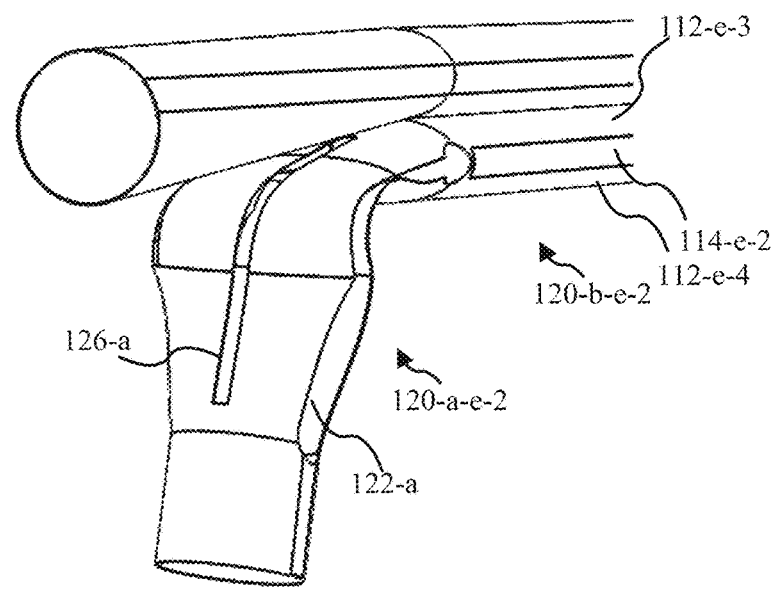
FIG. 2D shows a device in accordance with various embodiments.

FIG. 2D may then show foldable tube section 110-e-2 when the longitudinal unitary hinge region 120-a-e-2 has been folded; the one or more relief slots 126-a may allow for self-buckle. Foldable tube section 110-e-2 may be an example of foldable tube section 110-e of FIG. 2A. FIG. 2D may also show that the foldable tube section 110-e-2 may be folded in a region not shown such that multiple portions of foldable tube section 110-e-2 may be shown. In addition, FIG. 2D may show that the one or more lateral unitary hinge regions 120-b-e-2 may allow for flattening of the foldable tube section 110-e-2.

Figure 2E:
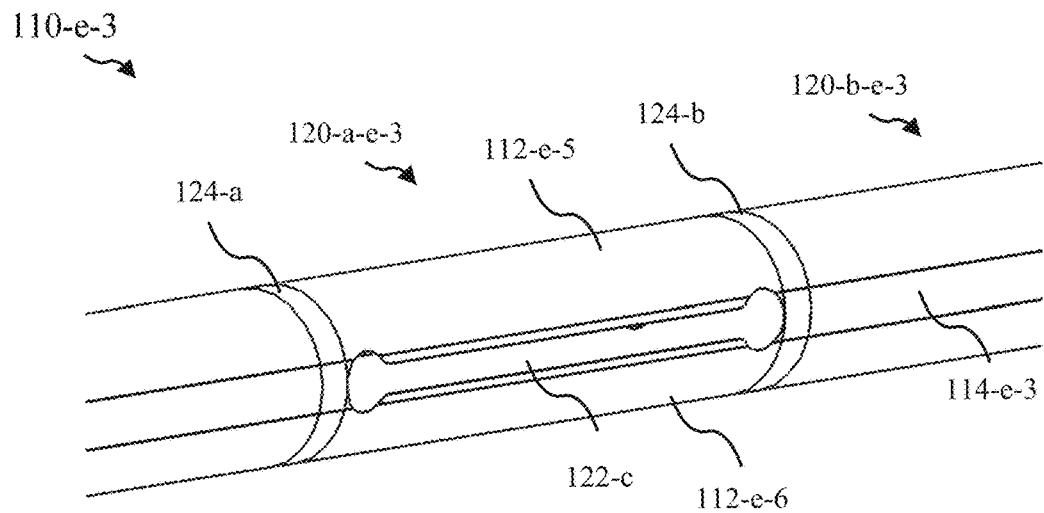
FIG. 2E shows a device in accordance with various embodiments.
Figure 2F:
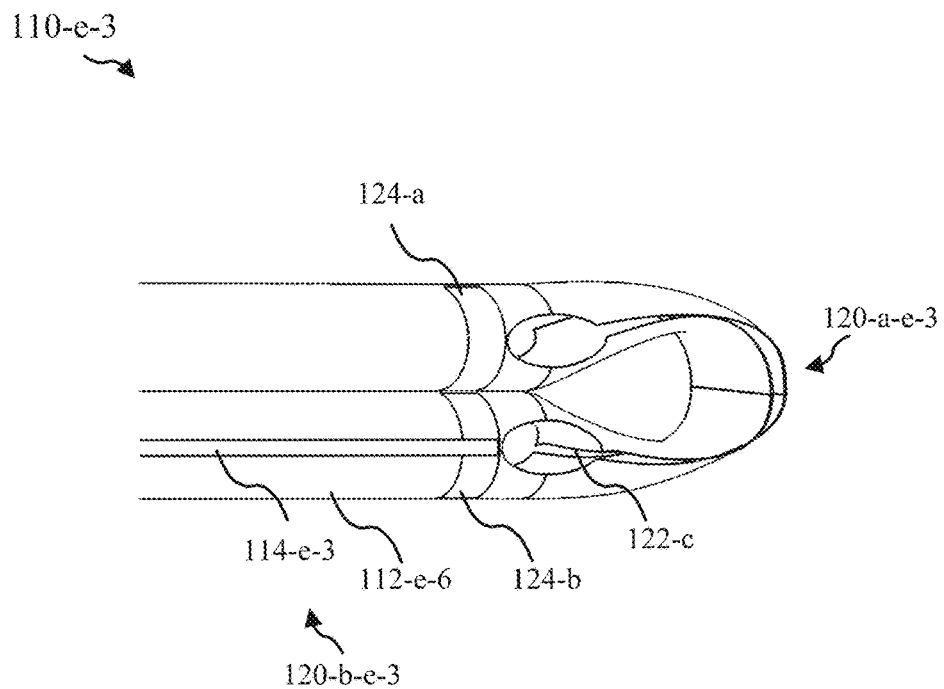
FIG. 2F shows a device in accordance with various embodiments.

FIG. 2E shows another foldable tube section 110-e-3 with a longitudinal unitary hinge region 120-a-e-3 and one or more lateral unitary hinge regions 120-b-e-3 in accordance with various embodiments. Foldable tube section 110-e-2 may be an example of foldable tube section 110-e of FIG. 2A. In some embodiments, the foldable tube section 110-e-3 may be constructed of multiple layers, such as carbon fiber layers 112-e-5, 112-e-6 and other layers 114-e-3 that may be devoid of carbon fibers. The longitudinal unitary hinge region 120-a-e-3 may include one or more apertures 122-c. The foldable tube section 110-e-3 may also include one or more circumferential bands 124-a, 124-b. The one or more circumferential bands 124-a, 124-b may be proximal or part of the longitudinal unitary hinge region 120-a-e-3 and may be formed from one or more composite material layers. In some embodiments, the circumferential bands 124-a, 124-b may be made from one or more composite material layers that may have a high strain capability, including, but not limited to a glass weave or carbon fibers. The circumferential bands 124-a, 124-b may function to avoid axial translation of the longitudinal unitary hinge region 120-a-e-3 of the foldable tube section 110-e-3. The circumferential bands 124-a, 124-b may provide structural depth such that the region at each end of the longitudinal unitary hinge region 120-a-e-3 remains circumferential, such as when foldable tube section 110-e-3 is folded and/or flatted with respect to the longitudinal unitary hinge region 120-a-e-3 and/or the lateral unitary hinge region 120-b-e-3. The circumferential bands 124-a, 124-b may help prevent damage to the foldable tube section 110-e-3 proximal to the longitudinal unitary hinge region 120-a-e-3 during stowage and/or deployment. FIG. 2F may then show foldable tube section 110-e-3 when the longitudinal unitary hinge region 120-a-e-1 has been folded; the lateral unitary hinge region 120-b-e-3 may also be flattened in some situations.

Figure 3B:
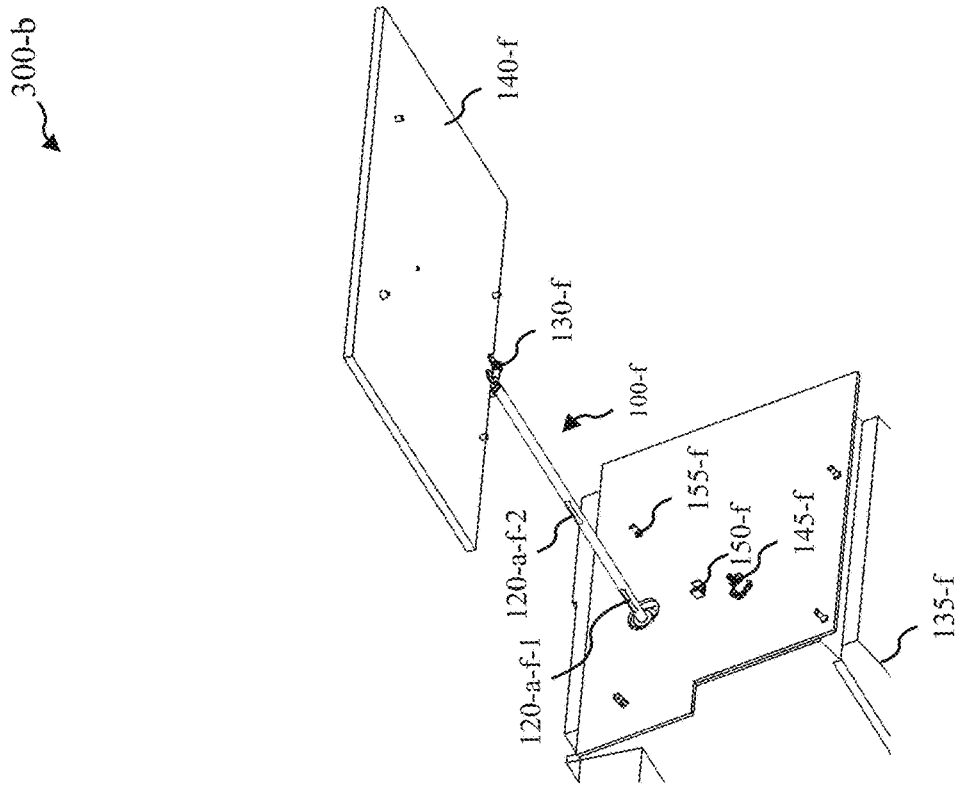
FIG. 3B shows a system in accordance with various embodiments.
Figure 3A:
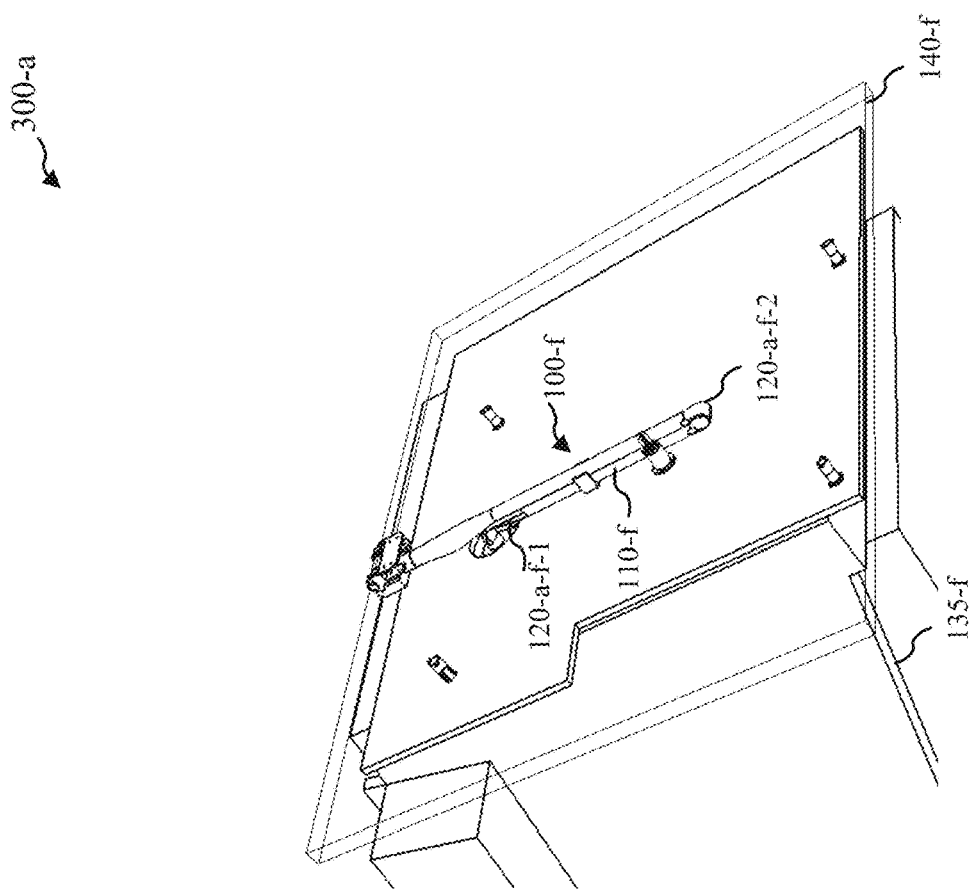
FIG. 3A shows a system in accordance with various embodiments.

Turning now to FIG. 3A and FIG. 3B, a system 300 in a stowed state 300-a and a deployed state 300-b is shown in accordance with various embodiments; this system 300 may provide an example of aspects of the systems and/or devices of FIG. 1A, FIG. 1B, FIG. 1C, FIG. 1E, FIG. 2A, FIG. 2B, FIG. 2C, FIG. 2D, FIG. 2E, and/or FIG. 2F. The system 300 may include a device 100-f that may include one or more foldable tube sections 110-f with one or more longitudinal unitary hinge regions 120-a-f-1, 120-a-f-2. The system 300 may include an object 140-f, such as a solar array, for deployment. The system 300 may also include a housing 135-f, such as a satellite housing. The system 300 may allow for simplicity and low part count, providing, the functionality of two folding hinges, a kickoff spring, and/or a rigid support structure with a single unitary-construction composite boom that may be rapidly manufactured in high volume. The foldable tube sections 110-f and unitary hinge regions 120-a-f-1, 120-f-2 may form part of a device such as devices 100 of aspects of FIG. 1A, FIG. 1B, FIG. 1C, FIG. 1E, FIG. 2A, FIG. 2B, FIG. 2C, FIG. 2D, FIG. 2E, and/or FIG. 2F.

The system 300 of FIG. 3A and FIG. 3B may include the one or more foldable tube sections 110-f, which may include two unitary hinge regions 120-a-f-1, 120-a-f-2 that may provide deployment authority and lock at the end of deployment. The foldable tube sections 110-f also may partially compress in the folded state to minimize stowed volume and may provide the functionality of a kickoff spring when it recovers its circular cross section during the initial deployment motion. Some embodiments may utilize lateral unitary hinge regions to facilitate flattening of the foldable tube sections (see, e.g. FIG. 2). The foldable tube sections 110-f may provide one or more of these functions with no moving mechanical parts and a total part count of "one" whereas a traditional folding boom may generally include multiple parts (e.g., 25 or more assembled parts), many of which are moving mechanical parts, to achieve the same functions. The foldable tube sections 110-f may be a simple polymer matrix composite tube that may be produced with a repeatable and rapid manufacturing process. Some embodiments of the foldable tube sections 110-f may include other composite constructions, as may be shown and/or described with respect to FIGS. 2A-2F, for example. The composite material may be composed of common constituent materials with flight heritage but may be engineered to accommodate high strain folding in specific regions. The system 300 may include a wire harness (not shown) that may be routed through the foldable tube section 110-f to service the different components, such as solar array panels and/or solar array drive assembly devices.

The system shown in FIGS. 3A and/or 3B may also show a Hold-Down and Release Mechanism (HDRM) subsystem 145-f and/or a snubber subsystem 155-f, which may lock the solar panel(s) 140-f, or other deployable objects, and release it on-orbit. One or more tube interfaces 130-f may be utilized to couple the foldable tube section 110 with the solar panels 140-f. A saddle component 150-f may also be shown.

In some embodiments, the foldable tube section 110-f may be constructed from heritage constituent materials including an epoxy polymer, carbon fibers, and/or glass fibers. The foldable tube section 110-f may include a circular cross section. In one embodiment, the foldable tube section 110-f may have a 26 mm inner diameter and may be manufactured using a low-cost, high-rate manufacturing process with a high degree of automation and repeatability. Other embodiments may utilize other diameters.

Longitudinal unitary hinge regions 120-a-f-1, 120-a-f-2 may include the areas shown with an engineered relief and may be composed of the tube geometry with strategic regions removed to allow them to flatten and fold. This longitudinal unitary hinge regions 120-a-f-1, 120-a-f-2 may be termed a "tube-hinge" due to their tubular geometry when deployed and are generally flight proven. The action of folding the longitudinal unitary hinge regions 120-a-f-1, 120-a-f-2 may store strain energy within the composite material, much like the energy stored within the torsion springs utilized by traditional "pin-and-clevis" hinges. When unconstrained, the stored strain energy may be released, forcing the foldable tube section 110-f to return to the deployed configuration. The torque-output of the individual longitudinal unitary hinge regions 120-a-f-1, 120-a-f-2 may be tailored with the composite laminate architecture and the relief geometry to result in reliable and benign deployment dynamics.

Figure 3C:
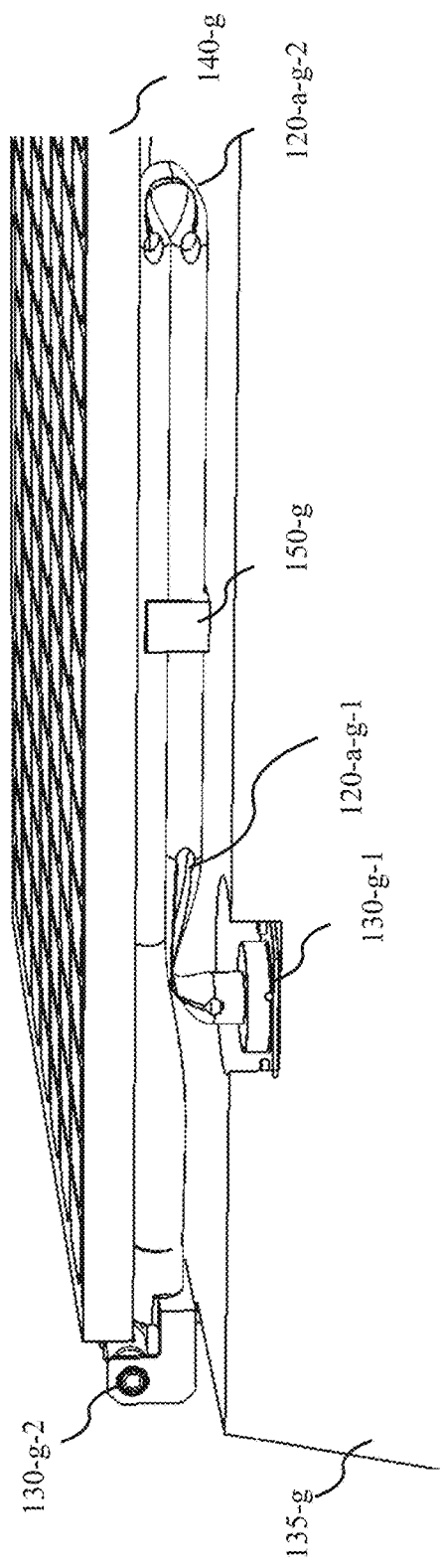
FIG. 3C shows a system in accordance with various embodiments.

FIG. 3C includes a system 300-c that is provided in accordance with various embodiments. System 300-c may provide an example of the stowed state of system 300-a of FIG. 3A. System 300-c may provide an example of aspects of the devices and/or systems of FIG. 1A, FIG. 1B, FIG. 1C, FIG. 1E, FIG. 2A, FIG. 2B, FIG. 2C, FIG. 2D, FIG. 2E, FIG. 2F, FIG. 3A, and/or FIG. 3B. System 300-c may include one or more foldable tube sections 110-g that may be designed to compress in its folded state in addition to folding at its tube-hinge regions 120-a-g-1, 120-a-g-2. The tube geometry may be a simple straight tube with no bends in its deployed state with a circular cross section. The straight-tube geometry may result in the foldable tube section 110-g stacking upon itself in the folded state as shown in FIG. 3C. The foldable tube section 110-g may be designed such that the circular cross section is compressed and ovalized in the stowed state. When a solar array panel 140-g, for example, may be fully preloaded, the foldable tube section 110-g cross section height may be compressed to ⅔ of its deployed cross section, for example. The folded and stacked tube section 110-g may be stabilized and may be supported by the saddle 150-g during and after compression. The tube compression may serve multiple purpose. For example, during deployment, the foldable tube section 110-g may provide a relatively high spring-rate deployment force for the first length of deployment functioning as a very affective "kick-off spring" with a distributed force over a relatively large portion of the solar array panel 140-g. The kick-off spring functionality may be provided with no additional parts or components further reducing cost and complexity. The foldable tube section 110-g compression may allow the appropriately sized tube to fit within a specified volume. FIG. 3C may also show longitudinal unitary hinge regions 120-a-g-1, 120-a-g-2 in a folded state. One may note that the foldable tube section 110-g may not necessarily compress upon its full length; for example, end region may include an uncompressed region. FIG. 3C may also show tube interface 130-g-2, which may be utilized to couple the foldable tube section 110-g with the solar array 140-g; another tube interface 130-g-1 may be utilized to couple the foldable tube section 110-g with a housing 135-g. Some embodiments may also utilize lateral unitary hinge regions as discussed with respect to FIG. 2B, for example.

Figure 3D:
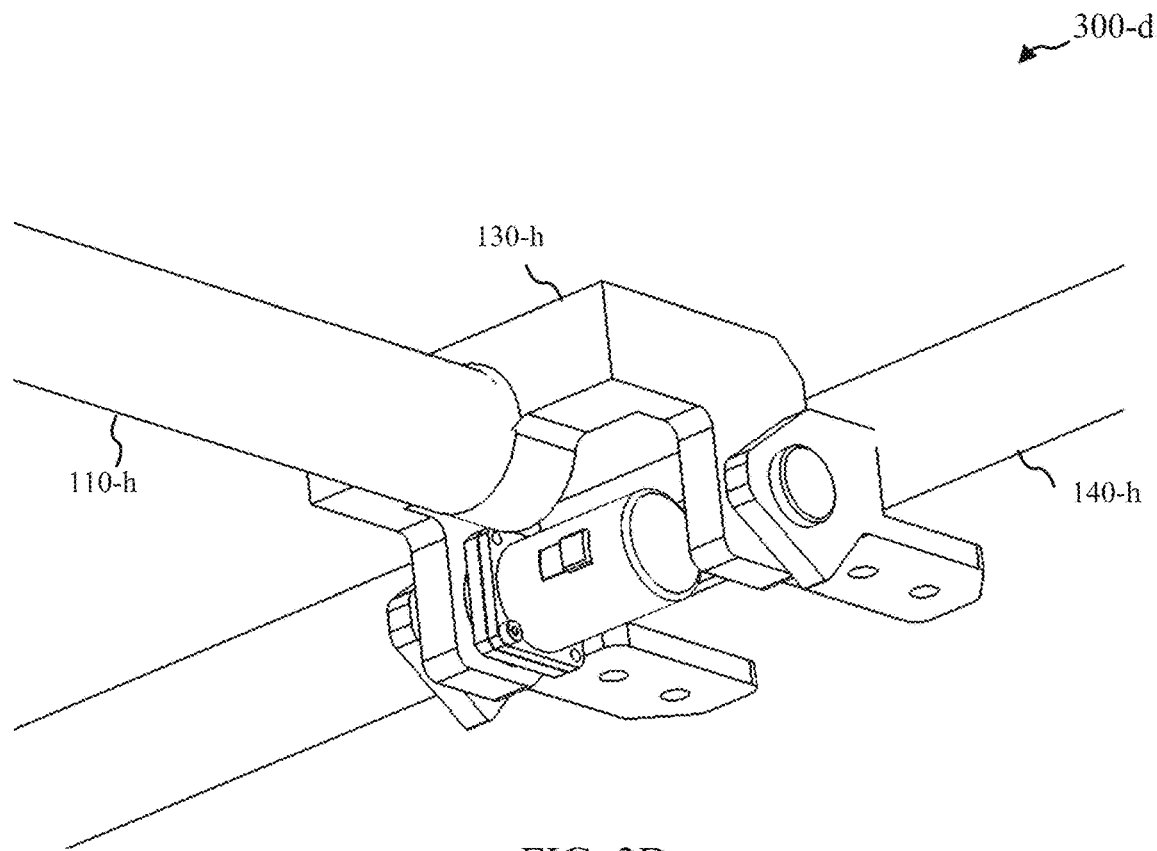
FIG. 3D shows a system in accordance with various embodiments.
Figure 3E:
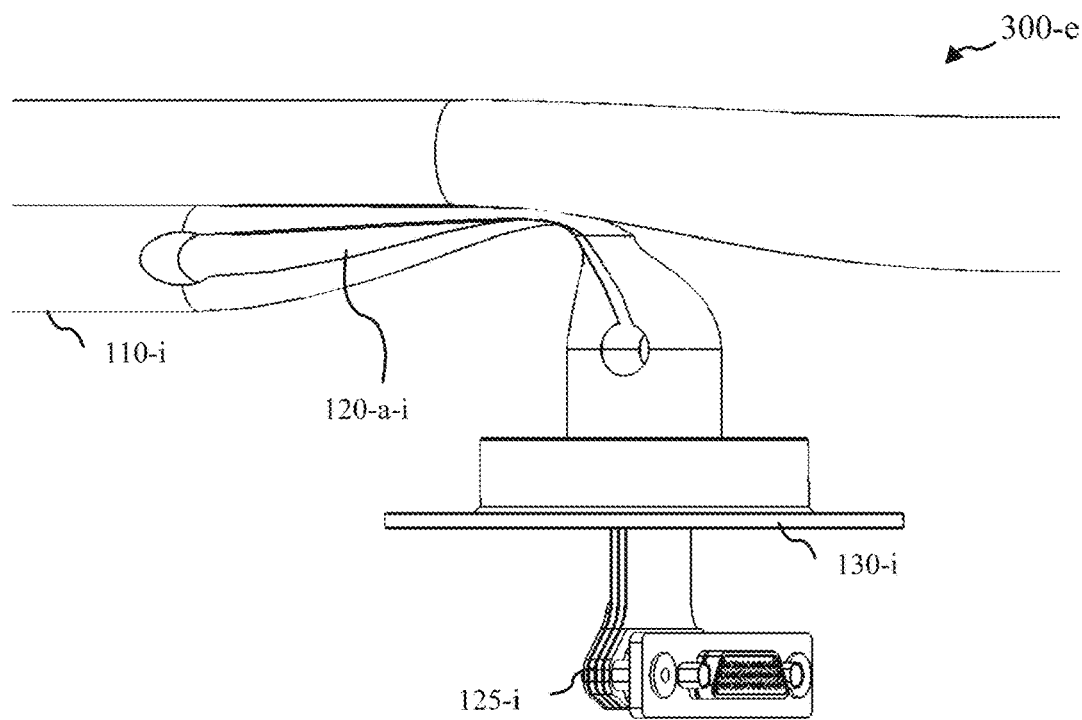
FIG. 3E shows a system in accordance with various embodiments.

FIG. 3D and FIG. 3E show aspects of a system 300-d and system 300-e with respect to one or more tube interfaces 130-h, 130-i. System 300-d and/or system 300-e may provide examples of aspects of system 300-a of FIG. 3A, system 300-b of FIG. 3B, and/or system 300-c of FIG. 3C, for example. System 300-d and/or system 300-e may provide an example of aspects the systems and/or devices of FIG. 1A, FIG. 1B, FIG. 1C, FIG. 1E, FIG. 2A, FIG. 2B, FIG. 2C, FIG. 2D, FIG. 2E, and/or FIG. 2F. For example, FIG. 3D may show tube interface 130-h that may mate the foldable tube section 110-h (and wire harness in some embodiments) to a solar array drive assembly 140-h. The tube interface 130-h may be fabricated from a variety of materials, including, but not limited to an aluminum part bonded to the foldable tube section 110-h, which may allow a mechanical connection from the foldable tube section 110-h to the solar array drive assembly 140-h. The mechanical interface may incorporate into the end fitting and may have clearance in its interior for solar array drive assembly electrical connector(s). In some embodiments, the bonded joint and fitting are designed to meet thermal, strength, and stiffness requirements with positive margin. The driving requirements may include thermal cycling, deployed stiffness, and deployed strength. The tube interface 130-f may accommodate a solar array drive assembly motor without imparting any off-axis moments into the motor due to its double clevis-hinge configuration, for example. FIG. 3E shows a tube interface 130-i that may couple with another portion of a foldable tube section 110-i and allow for coupling with a housing, such as a satellite housing (not shown). FIG. 3E also may show a portion of one or more wire harnesses 125-i that may pass through the one or more foldable tube sections 110-i. The one or more wire harnesses 125-i may provide power transfer from the array and/or be used to supply power and command information to the solar array drive assembly motor, for example. FIG. 3E may also show a portion of the foldable tube section 110-i that may include a folded longitudinal unitary hinge region 120-i.

Figure 4A:
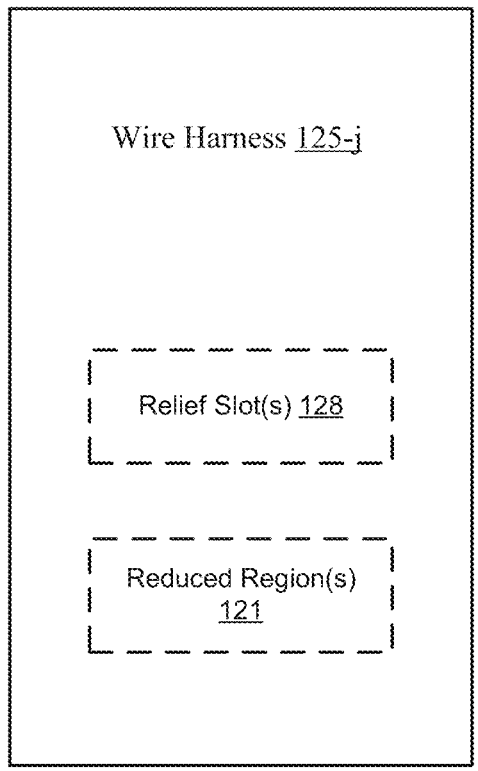
FIG. 4A shows a device in accordance with various embodiments.

Turning now to FIG. 4A, a wire harness 125-j in accordance with various embodiments is provided. Wire harness 125 may be an example of wire harness 125 of FIG. 1E and/or wire harness 125-i of FIG. 3E, for example. In some embodiments, wire harness 125-j may provide a power linkage to a solar array assembly or other deployable object, for example, via one or more flexible wire harnesses layers. In some embodiments, wire harness 125-j may provide aspects that may be dedicated to power transfer from the array; other aspects of wire harness 125-j may be used to supply power and command information to the solar array drive assembly motor, for example.

In some embodiments, wire harness 125-j may include printed circuit board/flex circuits that may offer unsurpassed size and weight reduction compared to discrete wiring. In some embodiments, flex circuits have very low parasitic torque (i.e. deployment resistance) across folding hinges over the entire applicable temperature range. In contrast, discrete wiring insulation may take a "set" over time and may create significant deployment resistance, particularly at cold temperatures. Mechanical performance of the flex circuitry may also be advantageous to different applications as they may be capable of withstanding extreme vibration environments and extended duty through hundreds of thousands of flexing cycles. Flex circuits at long lengths have traditionally been relatively expensive but prices have been generally drastically reduced over the past few years.

In some embodiments, the composite material utilized for the one or more foldable tube sections as discussed above, for example, may provide some level of Electromagnetic Interference (EMI) shielding; for example, the use of carbon composite layers may provide EMI shielding. However, EMI requirements in some embodiments may dictate the use of shielded wiring for a portion of the conductors. In some embodiments, the use of a separate discrete wire harness may be run in parallel with the flex harnesses. Circular, discrete wiring may be implemented in tube hinges by routing the harness through the center of the tube sections for most of the length but may not be run through the interior of the tube hinge as it may interfere with flattening and folding. Instead, discrete conductors may be routed out to the exterior of the tube section through the circular hole at one end of the tube-hinge cutout and back in through the circular cut-out at the other end of the same tube hinge such that the harness is routed externally for a portion of the hinge locations only in some embodiments.

Wire harnesses 125-j in accordance with various embodiments may include a variety of features that may provide different benefits and/or help facilitate utilizing of one or more wire harnesses with respect to a boom component. For example, some embodiments may include wire harnesses 125-j that may include one or more reduced regions 121, which may be referred to as reduced width or necked down regions; the reduced region(s) 121 may be configured to coincide with one or more longitudinal unitary hinge regions of a foldable tube section. This may facilitate routing of the wire harness 125-j through a foldable tube section and/or folding of the one or more longitudinal unitary hinge regions of a foldable tube section. Some embodiments of wire harnesses 125-*j* may include one or more tapes or layers. The use of multiple layers may facilitate flexibility of the wire harness 125-*j*. Each layer may include one or more traces; traces may be included on each side of each layer in some embodiments. The layers may be stacked together and connected with each other at one or more connector regions. Some embodiments of wire harness 125-*j* may include one or more relief slots 128. Relief slots 128 may help with routing of the wire harness 125-*j*. In some embodiments with one or more layers, the relief slots 128 may be included in one or more of the layers. In some embodiments, the wire harness 125-*j* may be configured to at least fold or flex laterally in a region of the one or more foldable tube sections other than the longitudinal hinge region.

Figure 4B:
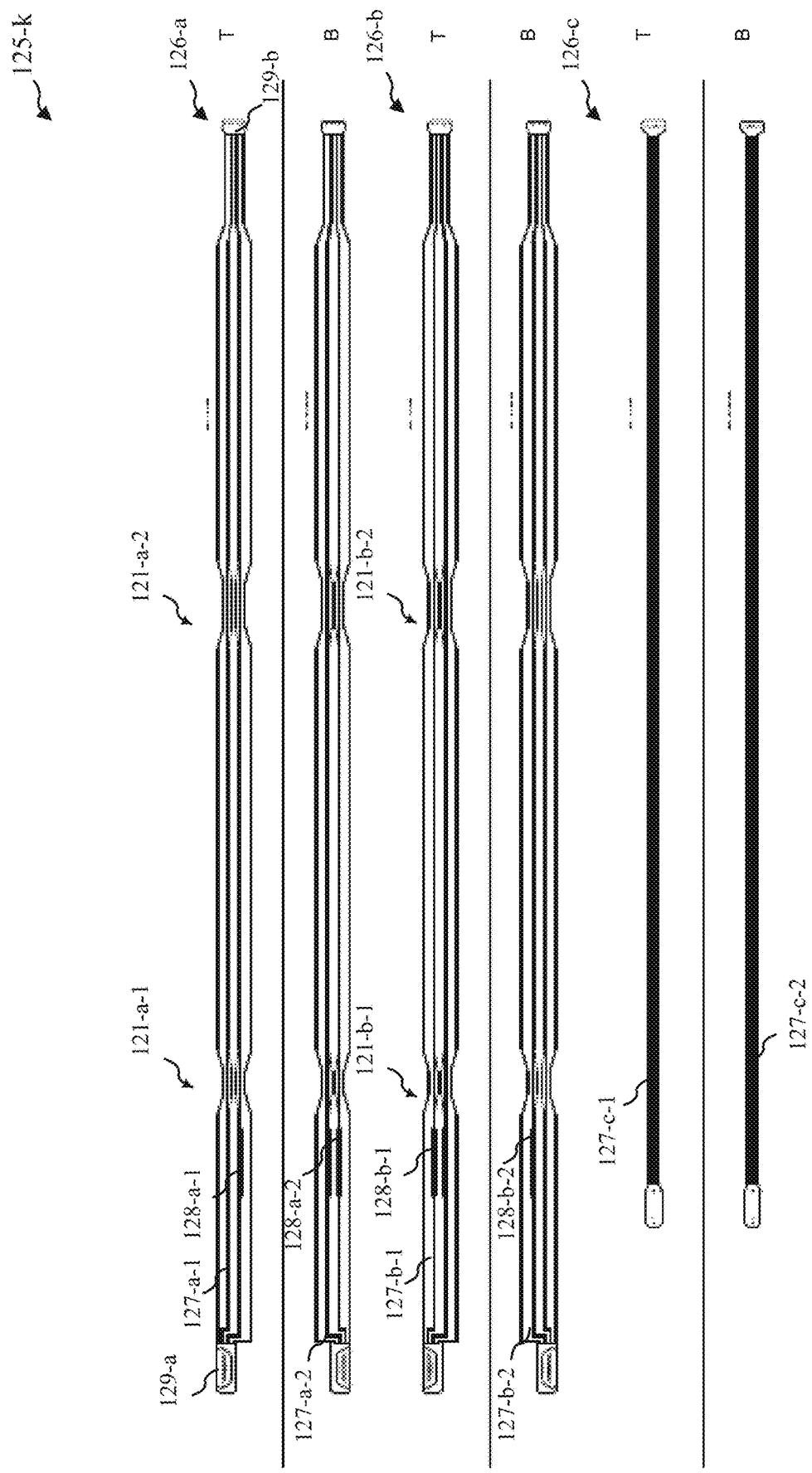
FIG. 4B shows a device in accordance with various embodiments.

FIG. 4B shows an example of a wire harness 125-*k* in accordance with various embodiments. Wire harness 125-*k* may be an example of the wire harness 125 of FIG. 1E, FIG. 3E, and/or FIG. 4A. The wire harness 125-*k* may be shown with respect to multiple layers or tapes 126-*a*, 126-*b*, and/or 126-*c*; some embodiments may have more or fewer layers 126. Each of the layers 126-*a*, 126-*b*, and/or 126-*c* may be shown with respect to a top view and a bottom view (note T and B designations in figure). In some embodiments, the top and/or the bottom of each layer 126-*a*, 126-*b*, and/or 126-*c* may include one or more traces 127-*a*-1/127-*a*-2, 127-*b*-1/127-*b*-2, and/or 127-*c*-1/127-*c*-2. Layers 126-*a* and 126-*b* may also show reduced regions 121-*a*-1/121-*a*-2 and 121-*b*-1/121-*b*-2, respectively. Layers 126-*a* and 126-*b* may also show relief slots 128-*a*-1/128-*a*-2 and 128-*b*-1/128-*b*-2, respectively. Traces 127 may carry data and/or power, for example. In some embodiments, traces 127-*c*-1/127-*c*-2 may be limited to data. In some embodiments, traces 127-*a*-1, 127-*a*-2, 127-*b*-1, and/or 127-*b*-2 may narrow within reduced regions 121-*a*-1, 121-*a*-2, 121-*b*-1, and/or 121-*b*-2. Wire harness 125-*k* may also include connector regions 129-*a*/129-*b*, shown with respect to top layer 126-*a*; the other views and layers may also include connector regions as may be shown in FIG. 4B, though not called out.

Figure 4C:
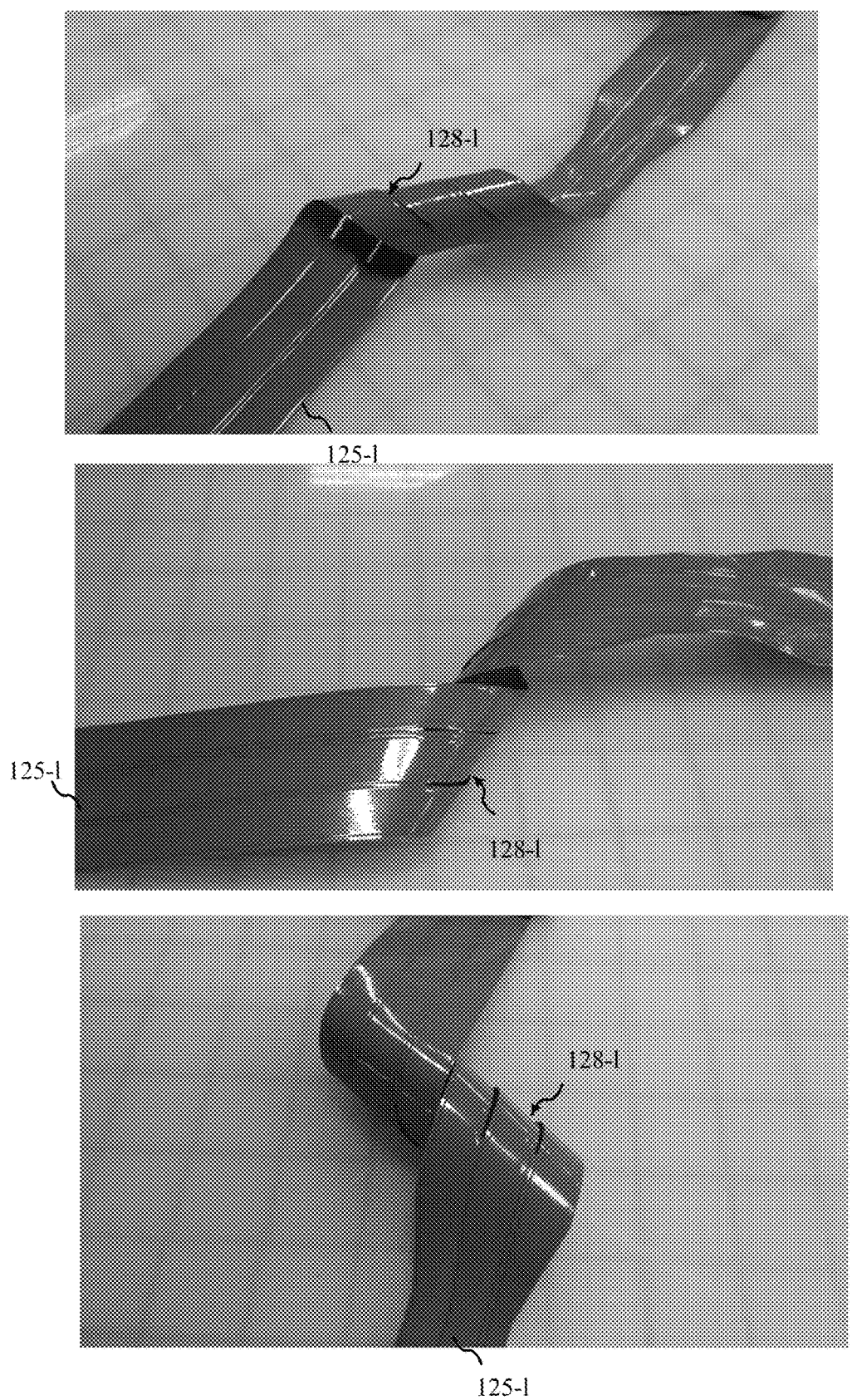
FIG. 4C shows photos of a device in accordance with various embodiments.

FIG. 4C shows three photographs of a wire harness 125-1 in accordance with various embodiments. Wire harness 125-1 may be an example of the wire harness 125 of FIG. 1E, FIG. 3E, FIG. 4A, and/or FIG. 4B. Wire harness 125-1 may include one or more relief slots 128-1. The use of relieving slots 128-1 may facilitate routing, rolling, directing, and/or deploying of the wire harness 125-1, for example.

Figure 4D:
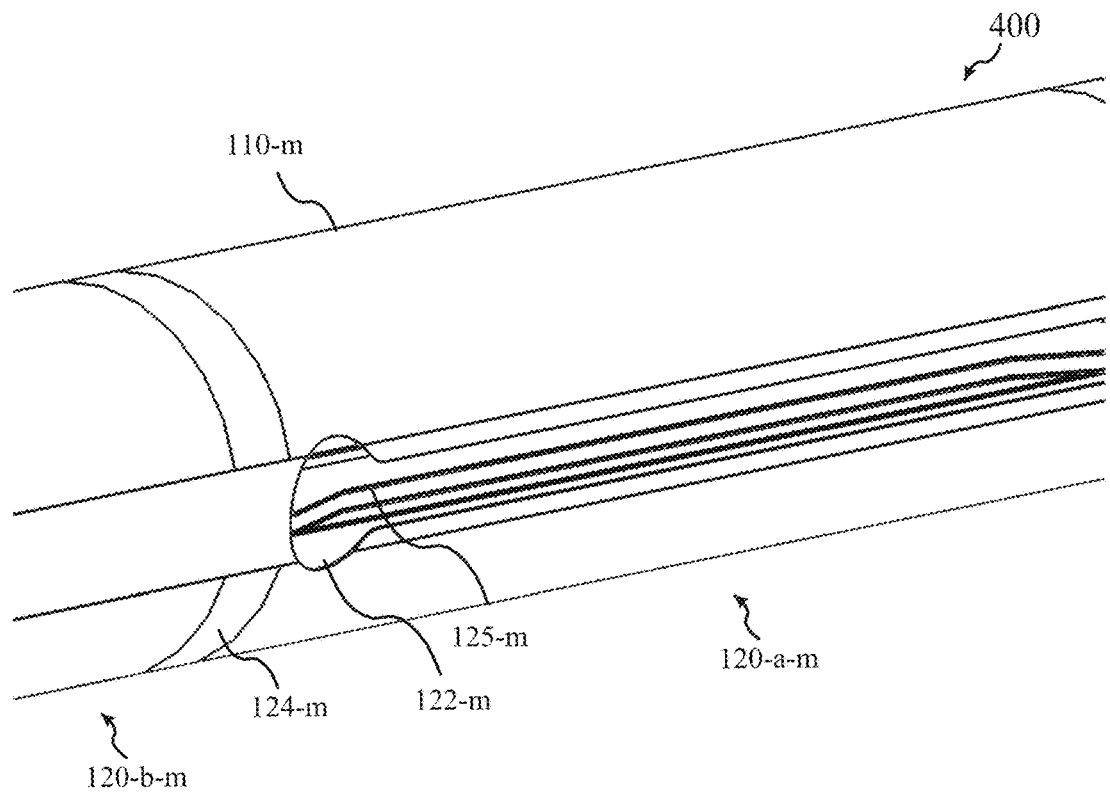
FIG. 4D shows a system and/or device in accordance with various embodiments.
Figure 4E:
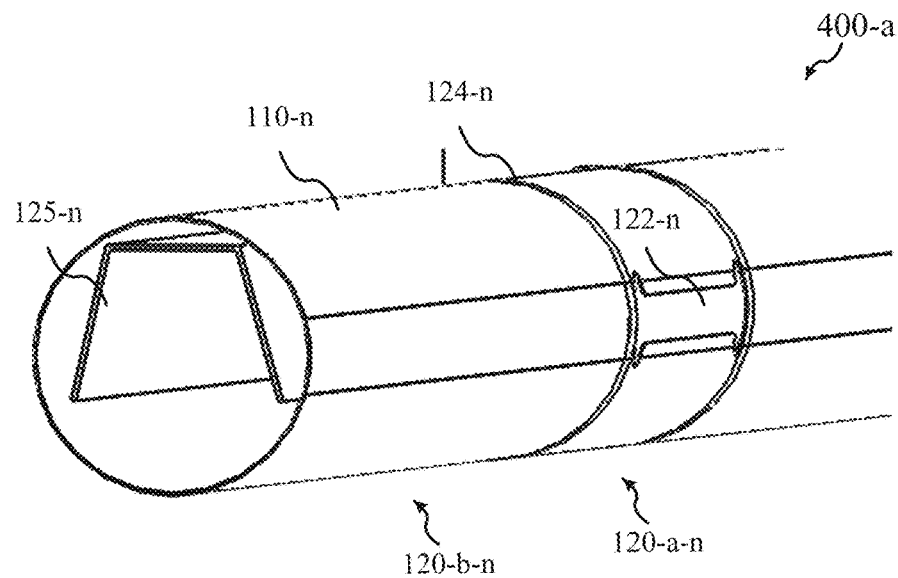
FIG. 4E shows a system and/or device in accordance with various embodiments.

FIG. 4D shows aspects of a system 400 in accordance with various embodiments. System 400 may provide examples of aspects of systems and/or devices of 1A, FIG. 1B, FIG. 1C, FIG. 1D, FIG. 1E, FIG. 2A, FIG. 2B, FIG. 2C, FIG. 2D, FIG. 2E, FIG. 2F, FIG. 3A, FIG. 3B, FIG. 3C, FIG. 3D, FIG. 3E, FIG. 4A, FIG. 4B, and/or FIG. 4C. System 400 may show a portion of a wire harness 125-*m*. Wire harness 125-*m* may show a reduced region that may coincide with a longitudinal unitary hinge region 120-*a*-*m* of a foldable tube section 110-*m*, as may be seen through aperture 122-*m* of longitudinal unitary hinge region 120-*a*-*m*. The wire harness 125-*m* may be configured to at least fold or flex laterally in a region of the foldable tube section 110-*m* other than the longitudinal hinge region 120-*a*-*m*; in some embodiments, the wire harness 125-*m* may be configured to at least fold or flex laterally in a region of the foldable tube section 110-*m* through the longitudinal hinge region 120-*a*-*m*. System 400 may also show a circumferential band 124-*m* and a lateral unitary hinge region 120-*b*-*m*. FIG. 4E may then show an end portion 400-*a* of foldable tube section 110-*n* where the wire harness 125-*n* may be shown to be configured to at least fold or flex laterally in a region of the one or more foldable tube sections 110-*n* other than the longitudinal hinge region 120-*a*-*n*. In some embodiments, the wire harness 125-*n* may form a portion of a trapezoidal cross-section when folded to fit within the foldable tube section. FIG. 4E may also show one or more circumferential bands 124-*n*, aperture 122-*n* of longitudinal unitary hinge region 120-*a*-*n*, and a lateral unitary hinge region 120-*b*-*n*. System 400-*a* may provide examples of aspects of systems and/or devices of FIG. 1A, FIG. 1B, FIG. 1C, FIG. 1D, FIG. 1E, FIG. 2A, FIG. 2B, FIG. 2C, FIG. 2D, FIG. 2E, FIG. 2F, FIG. 3A, FIG. 3B, FIG. 3C, FIG. 3D, FIG. 3E, FIG. 4A, FIG. 4B, FIG. 4C, and/or FIG. 4E.

Figure 4G:
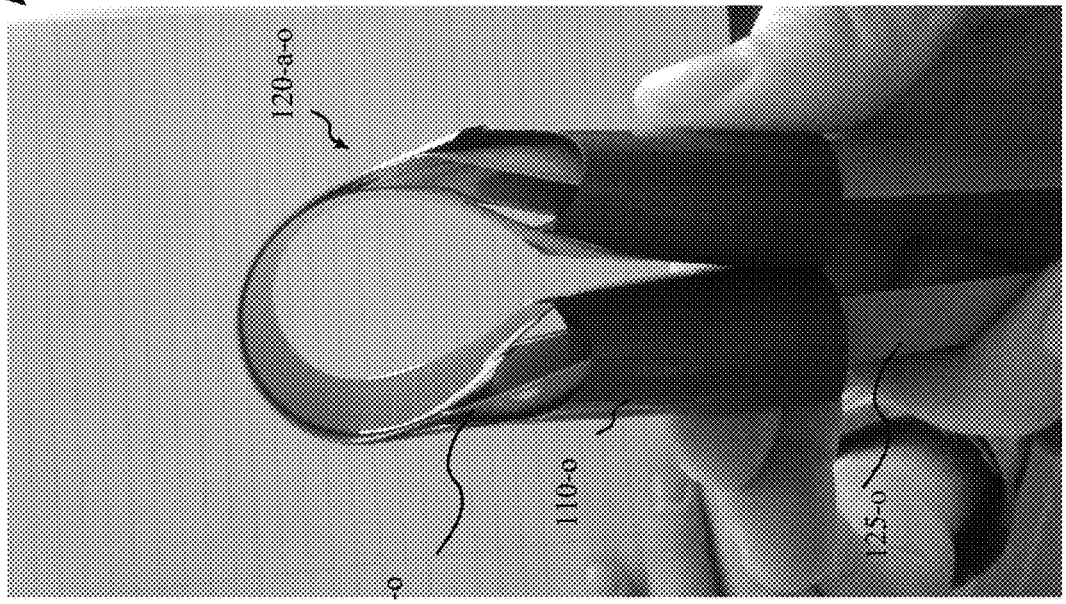
FIG. 4G shows a photo of a system and/or device in accordance with various embodiments.
Figure 4F:
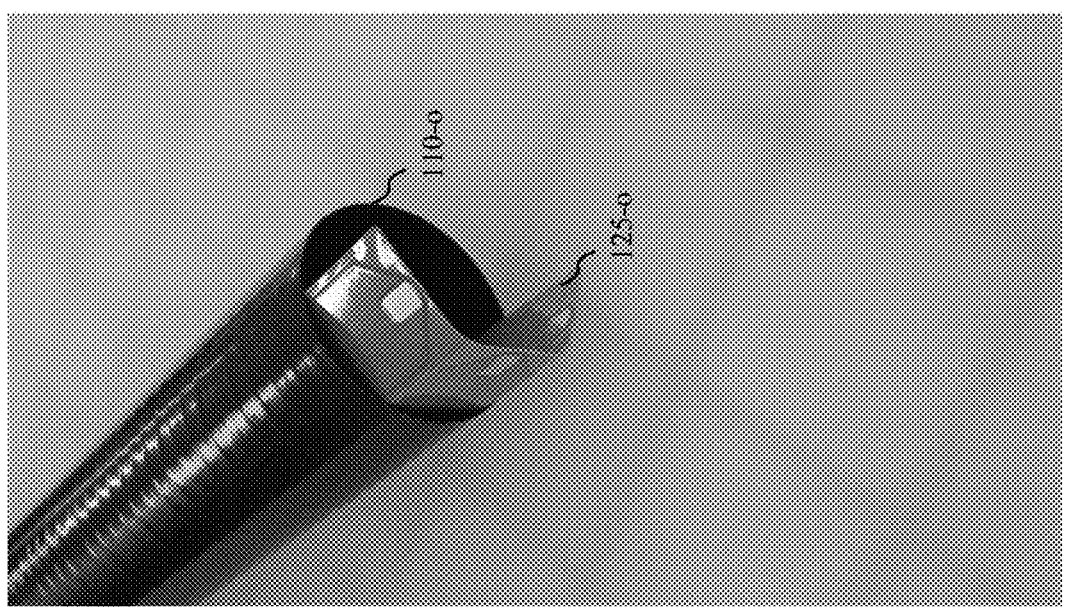
FIG. 4F shows a photo of a system and/or device in accordance with various embodiments.
Figure 4H:
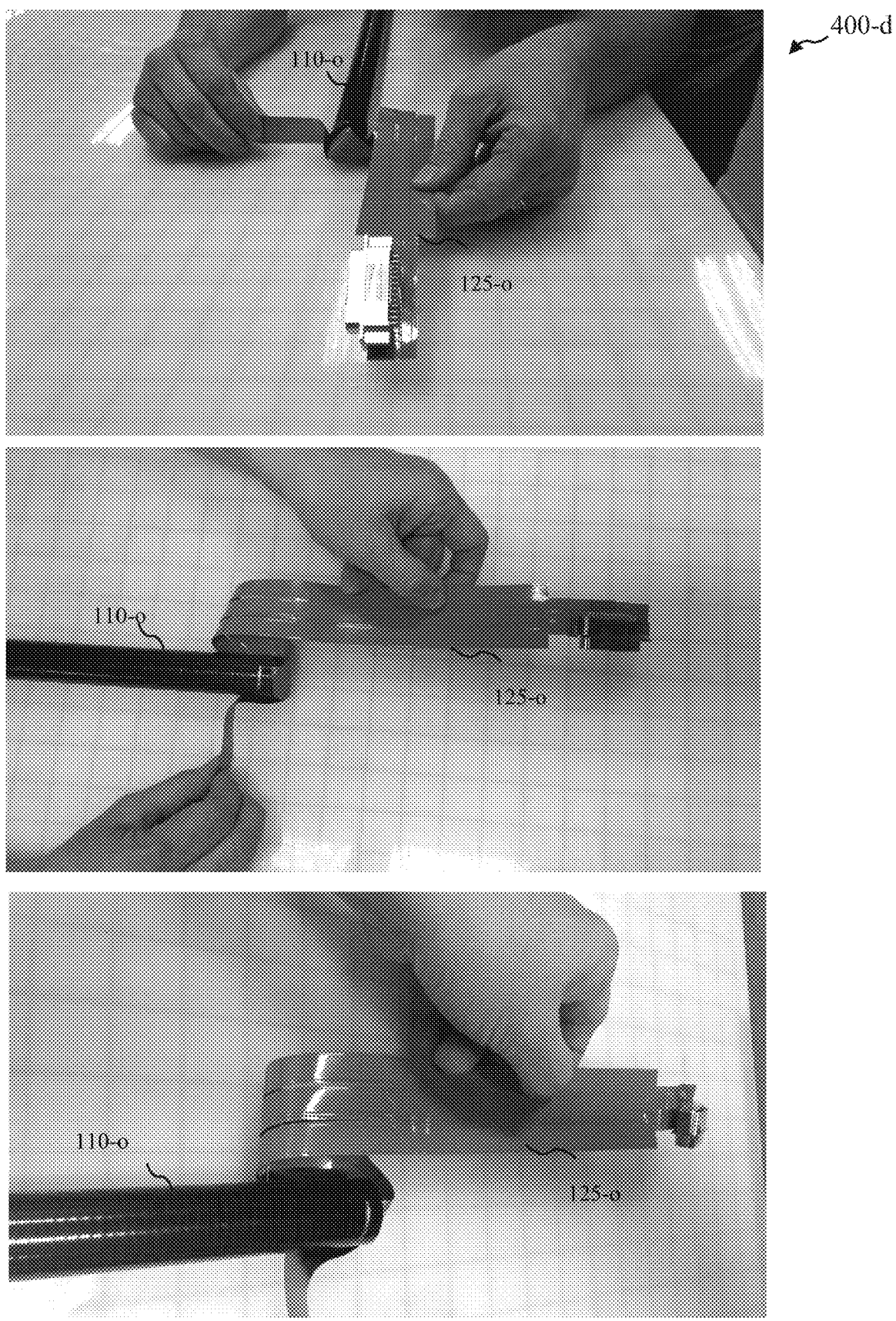
FIG. 4H shows photos of a system and/or device in accordance with various embodiments.

Turning now to FIG. 4F, FIG. 4G and FIG. 4H, photographs of aspects of system 400-*b*, 400-*c*, and 400-*d* are provided in accordance with various embodiments. In general, 400-*b*, 400-*c*, and 400-*d* may include a wire harness 125-*o* disposed within at least a portion of a foldable tube section 110-*o*. For example, FIG. 4F shows a portion of wire harness 125-*o* as it may emerge from the foldable tube section 110-*o*; the wire harness 125-*o* may be configured to at least fold or flex laterally in a region of the foldable tube section 110-*o* other than a longitudinal hinge region 120-*a*-*o*; the portion of the wire harness shown may be folded to fit within the foldable tube section 110-*o*. FIG. 4G may show a reduced region 121-*o* of the wire harness 125-*o* as it passes through a longitudinal unitary hinge region 120-*a*-*o* of the foldable tube section 110-*o*. FIG. 4H then may show three photographs of the wire harness 125-*o* as it may emerge from an end of the foldable tube section 110-*o*. These figures may show that portions of the wire harness 125-*o* where the width may be greater than the diameter of the foldable tube section 110-*o*. These systems may include aspects of FIG. 1A, FIG. 1B, FIG. 1C, FIG. 1D, FIG. 1E, FIG. 2A, FIG. 2B, FIG. 2C, FIG. 2D, FIG. 2E, FIG. 2F, FIG. 3A, FIG. 3B, FIG. 3C, FIG. 3D, FIG. 3E, FIG. 4A, FIG. 4B, FIG. 4C, FIG. 4D, and/or FIG. 4E.

Figure 5:
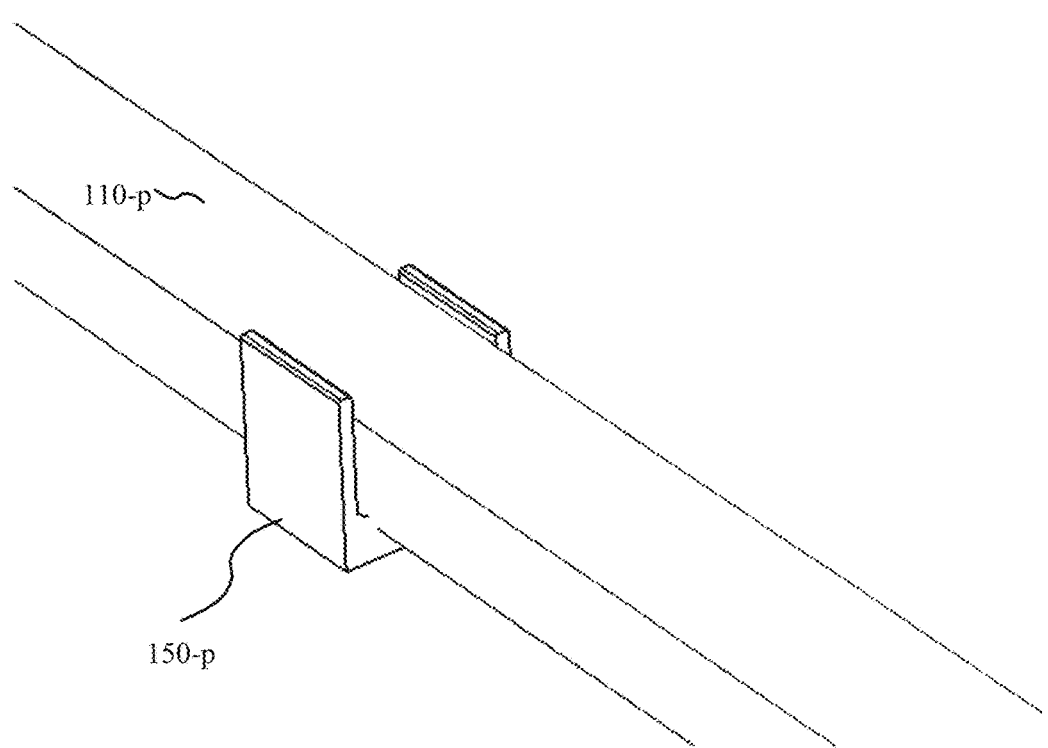
FIG. 5 shows a system in accordance with various embodiments.

Turning now to FIG. 5, aspects of a system 500 are provided in accordance with various embodiments that may include a portion of foldable tube section 110-*p* and a saddle component 150-*p*. System 500 may include aspects of FIG. 1A, FIG. 1B, FIG. 1C FIG. 1D, FIG. 1E, FIG. 2A, FIG. 2B, FIG. 2C, FIG. 2D, FIG. 2E, FIG. 2F, FIG. 3A, FIG. 3B, FIG. 3C, FIG. 3D, FIG. 3E, FIG. 4A, FIG. 4B, FIG. 4C, FIG. 4D, FIG. 4E, FIG. 4F, FIG. 4G, and/or FIG. 4H. The foldable tube section 110-*p* may be engineered such that its cross section is compressed during the folding and HDRM preload operation. The saddle component 150-*p* may constrain the folded and compressed tube section 110-*p* during the folding operation, ground handling, and launch. The foldable tube section 110-*p* may be compressed by a combination of the saddle component 150-*p* and the surrounding bus radiator and solar array panel surfaces. This distributed compression force may result in a distributed kickoff force. In some embodiments, the saddle component 150-*p* for each foldable tube section 110-*p* may contain two identical parts (four per satellite, for example) that may be integrated to the bus with a total of four screws and may have a high tolerance for positional inaccuracy and misalignment.

Figure 6:
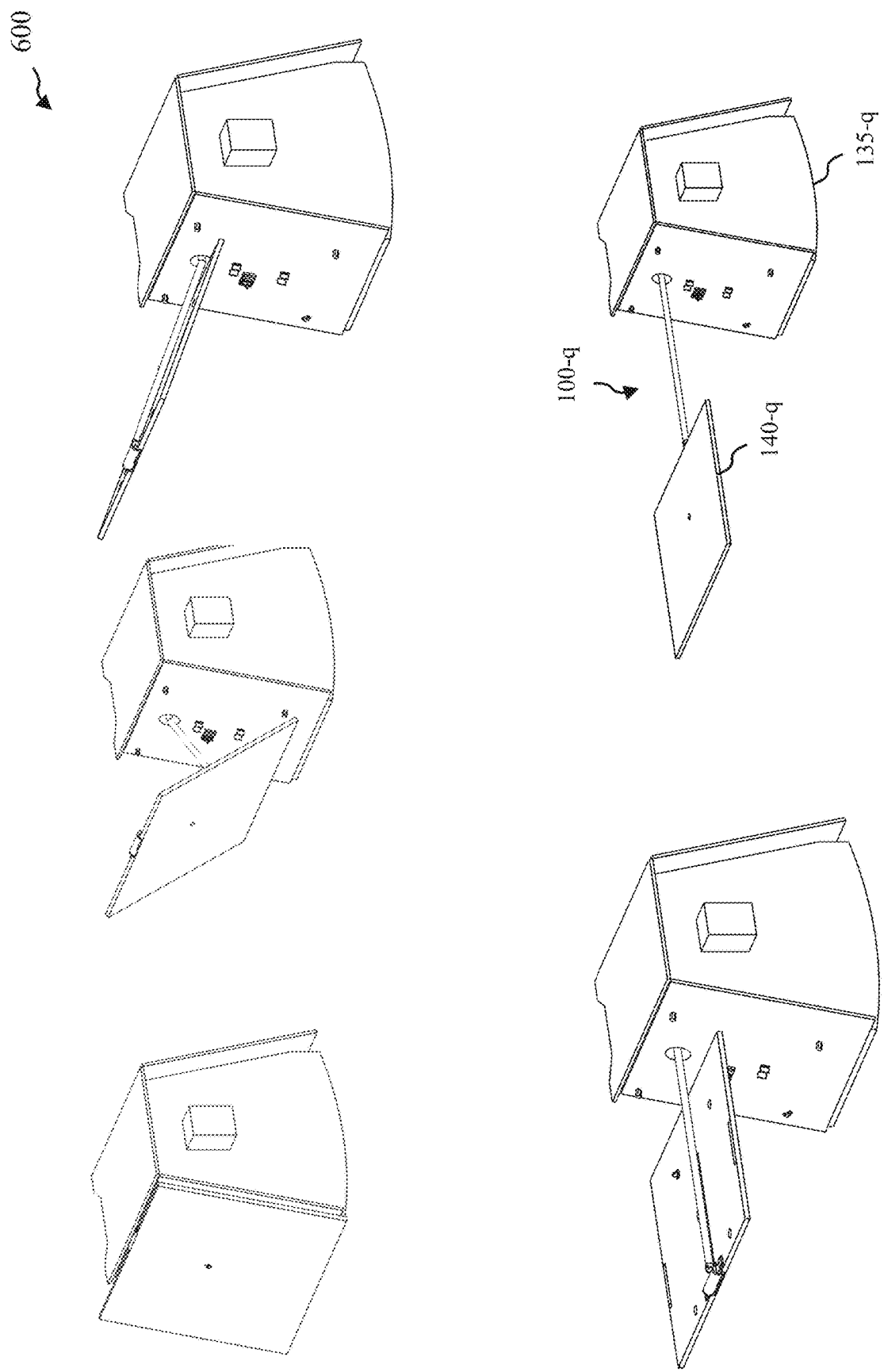
FIG. 6 shows a deployment sequence of a system in accordance with various embodiments.

FIG. 6 shows a system deployment process 600 in accordance with various embodiments. System deployment process 600 may utilize different systems and/or devices, such as those shown with respect to FIG. 1A, FIG. 1B, FIG. 1C, FIG. 1E, FIG. 2A, FIG. 2B, FIG. 2C, FIG. 2D, FIG. 2E, FIG. 2F, FIG. 3A, FIG. 3B, FIG. 3C, FIG. 3D, FIG. 3E, FIG. 4A, FIG. 4B, FIG. 4C, FIG. 4D, FIG. 4E, FIG. 4F, FIG. 4G, FIG. 4H, and/or FIG. 5. For example, process 600 may show a deployment process from stowed system 300-a of FIG. 3A to deployed system 300-b of FIG. 3B. Each stage generally shows an object to deploy, such as a solar array 140-q, a device 100-q with one or more foldable tube sections and one or more unitary hinge regions (not necessarily shown due to scale), and a spacecraft housing 135-q. It may include free spacecraft dynamics and may predict bus motions during and after deployment. At the beginning of deployment, tube pre-load may set the initial deployment trajectory of the panel 140-q away from the spacecraft 135-q and slightly upward. This motion may allow the lower edge of the panel 140-q to remain clear of the spacecraft 135-q as it begins to rotate flat. The system may not be symmetric in that the device 100-q may not go through the CG of the panel 140-q. This may result in panel off-axis rotations during and after deployment. While visually evident, these motions may not have a significant impact on deployment reliability. The deployment sequencing of FIG. 6 may have been accelerated for computational efficiency and to demonstrate analysis capabilities. As a result, there may be significant residual dynamics during beta axis unfolding. Operationally, these dynamics may be allowed to settle prior to solar panel deployments. Here, the dynamics may increase bus motions.

Figure 7A:
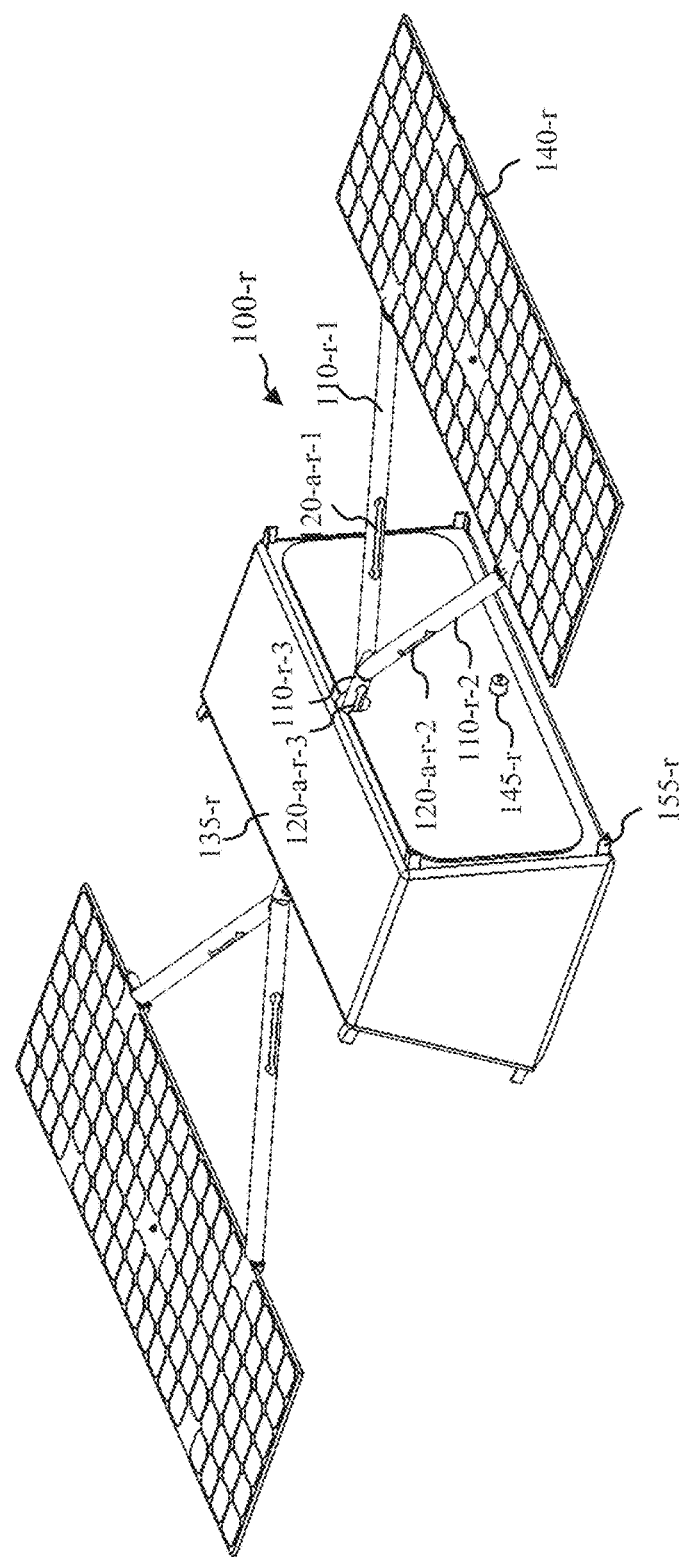
FIG. 7A shows a system in accordance with various embodiments.
Figure 7D:
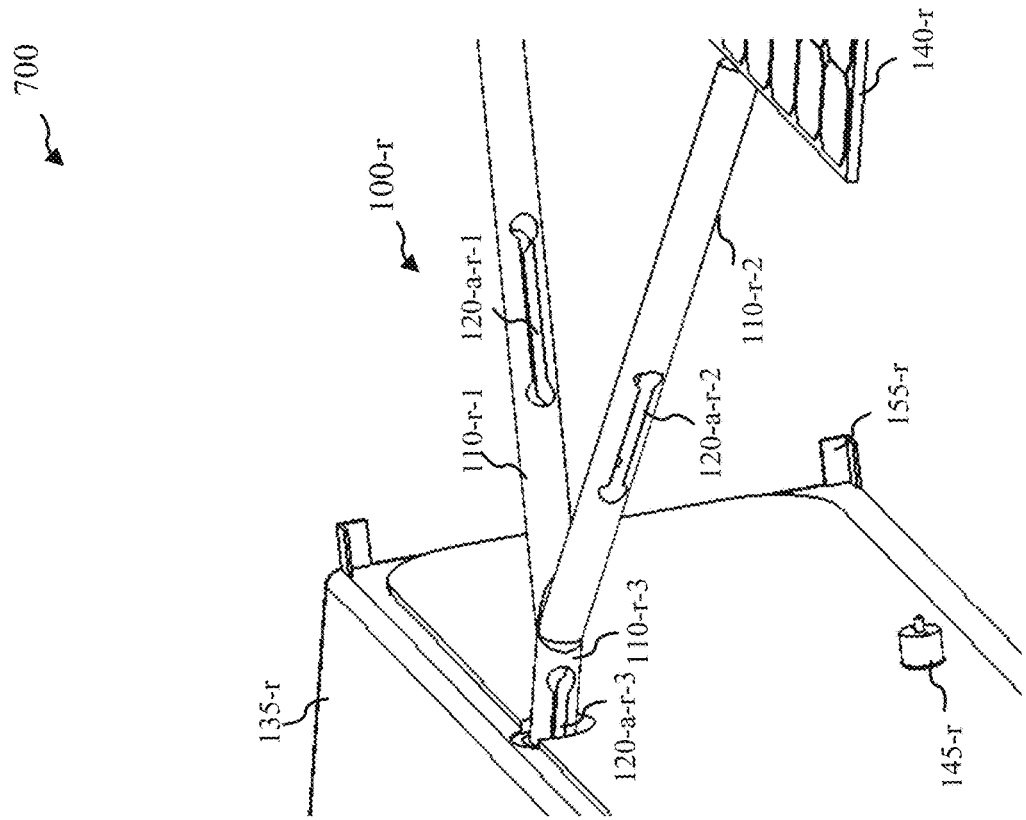
FIG. 7D shows a system in accordance with various embodiments.
Figure 7C:
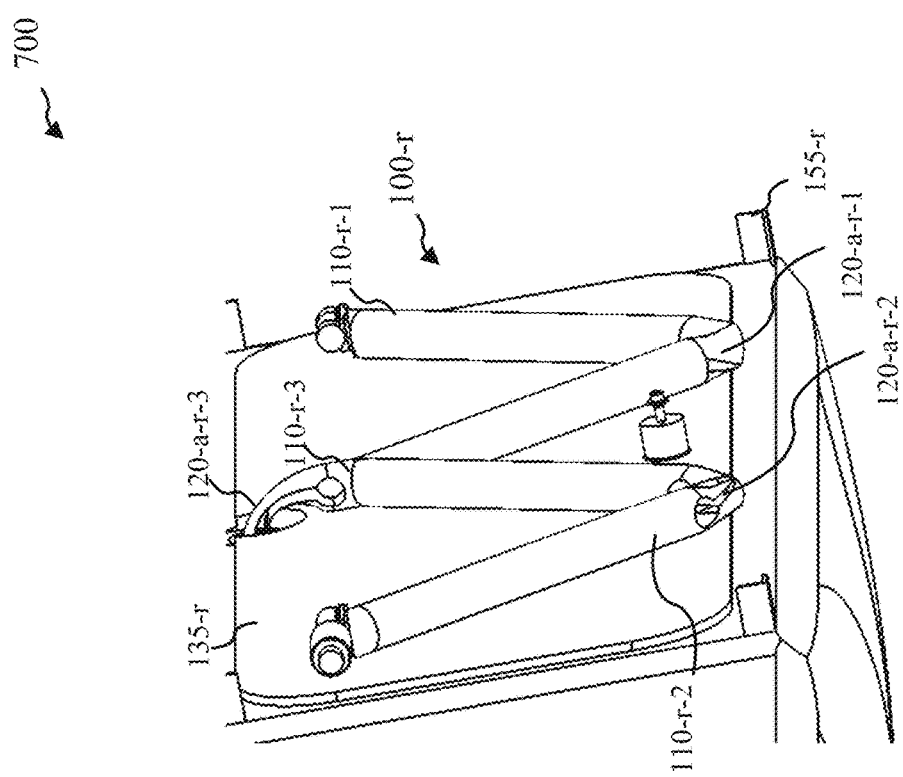
FIG. 7C shows a system in accordance with various embodiments.

Turning now to FIG. 7A, a system 700 in accordance with various embodiments is provided. System 700 may include aspects of the devices and/or systems of FIG. 1A, FIG. 1B, FIG. 1D, FIG. 1E, FIG. 2A, FIG. 2B, FIG. 2C, FIG. 2D, FIG. 2E, FIG. 2F, FIG. 4A, FIG. 4B, FIG. 4C, FIG. 4D, FIG. 4E, FIG. 4F, FIG. 4G, FIG. 4H, and/or FIG. 5. System 700 may be an example of the use of foldable tube components that may include a yoke configuration; the yoke configuration may include two arm portions 110-r-1, 110-r-2 as foldable tube sections and one base portion 110-r-3 as a foldable tube section; the base portion 110-r-3 may couple with a housing 135-r, which may include a spacecraft housing, for example. Each of the two arm portions 110-r-1, 110-r-2 may include one or more longitudinal unitary hinge regions 120-a-r-1, 120-a-r-2 and the base portion 110-r-3 includes one or more longitudinal unitary hinge regions 120-a-r-3. The two arm portions 110-r-1, 110-r-2 and the base portion 110-r-3 may be configured to avoid overlapping when the one or more longitudinal unitary hinges regions 120-a-r-1, 120-a-r-2 are folded. System 700 may include two solar array panel wings 140-r, with one wing called out along with the associated yoke configuration. System 700 may also include a hold down and release mechanism(s) 145-r. Snubber component(s) 155-r may also be included. System 700 may show two yoke configurations with solar panels, though only one set is called out. FIG. 7B shows a deployment sequence through stages 701, 702, 703 with respect to system 700 in accordance with various embodiments. Stage 701 may reflect a stowed state. Stage 702 may reflect a mid-deployment state. Stage 703 may reflect a full deployment state. The foldable tube components 110-r-1, 110-r-2, 110-r-3 of system 700 with longitudinal unitary hinges 120-a-r-1, 120-a-r-2, 120-a-r-3 may spontaneously deploy when the HDRM is released. FIG. 7C may show aspects of system 700 that highlight the device 100-r in a stowed state, such as stowed state 701 of FIG. 7B, while FIG. 7D shows aspects of system 700 that highlight the device 100-r in a full deployed state, such as fully deployed state 703 of FIG. 7B, with respect to a yoke configuration.

Figure 8:
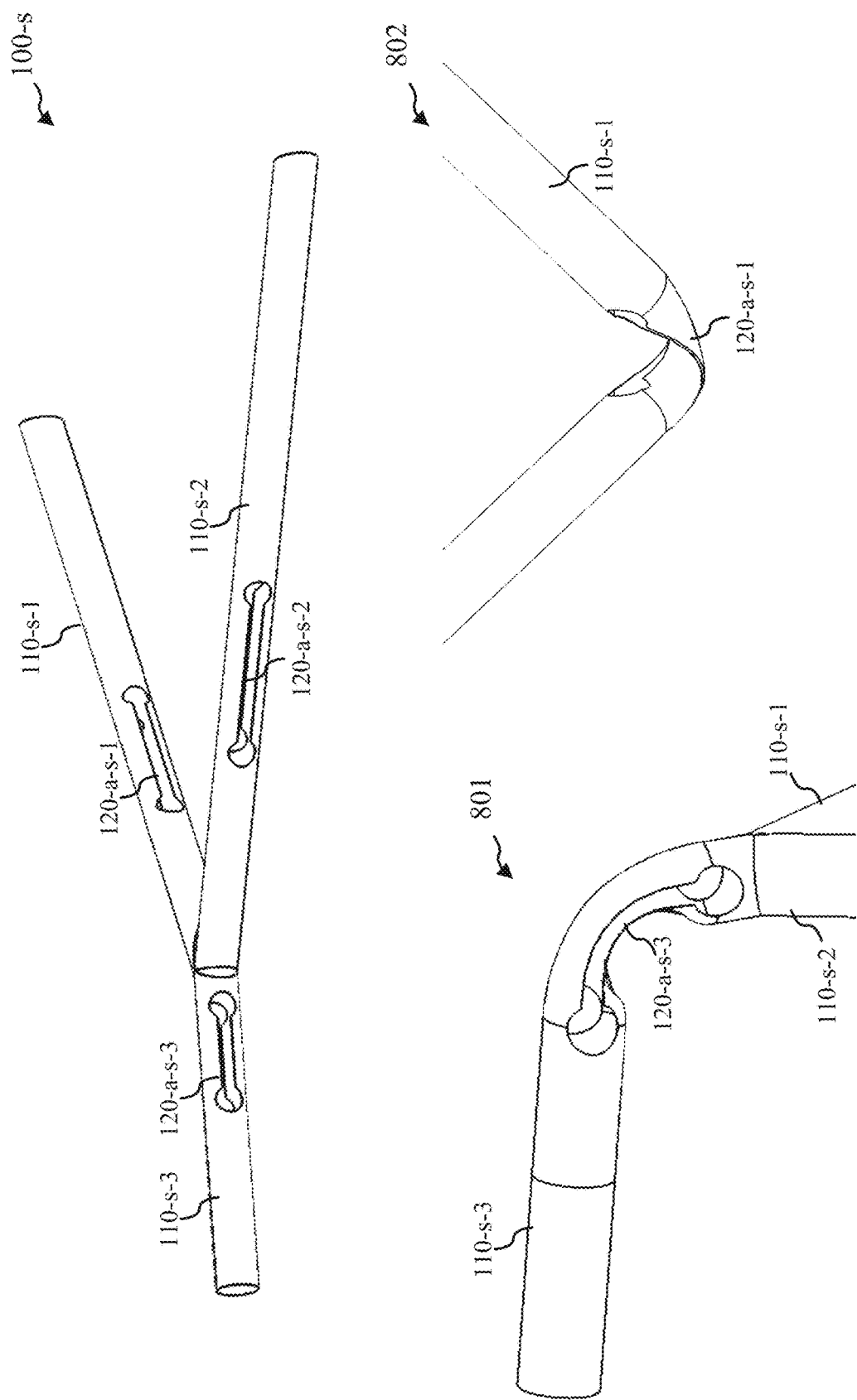
FIG. 8 shows different aspects of a device in accordance with various embodiments.

FIG. 8 shows an example of a device 100-s in accordance with various embodiments. Device 100-s may be an example of aspects of the systems and/or devices of FIG. 1A, FIG. 1B, FIG. 1D, FIG. 1E, FIG. 2A, FIG. 2B, FIG. 2C, FIG. 2D, FIG. 2E, FIG. 2F, FIG. 4A, FIG. 4B, FIG. 4C, FIG. 4D, FIG. 4E, FIG. 4F, FIG. 4G, FIG. 4H, FIG. 5, FIG. 7A, FIG. 7B, FIG. 7C, and/or FIG. 7D. Device 100-s may be an example of the use of foldable tube sections with unitary hinge components that may include a yoke configuration; the yoke configuration may include two arm portions and one base portion as foldable tube sections 110-s-1, 110-s-2, 110-s-3, with respective longitudinal unitary hinge regions 120-a-s-1, 120-a-s-2, 120-a-s-3. Each of the two arm portions 110-s-1, 110-s-2 may include one or more longitudinal unitary hinge regions 120-a-s-1, 120-a-s-2 and the base portion 110-s-3 includes one or more longitudinal unitary hinge regions 120-a-s-3. The two arm portions 110-s-1, 110-s-2 and the base portion 110-s-3 may be configured to avoid overlapping when the one or more hinge regions 120-a-s-1, 120-a-s-2, 120-a-s-3 are folded. FIG. 8A shows aspects of device 100-s with respect to one or more hinge bend axes 801 and 802.

Figure 9:
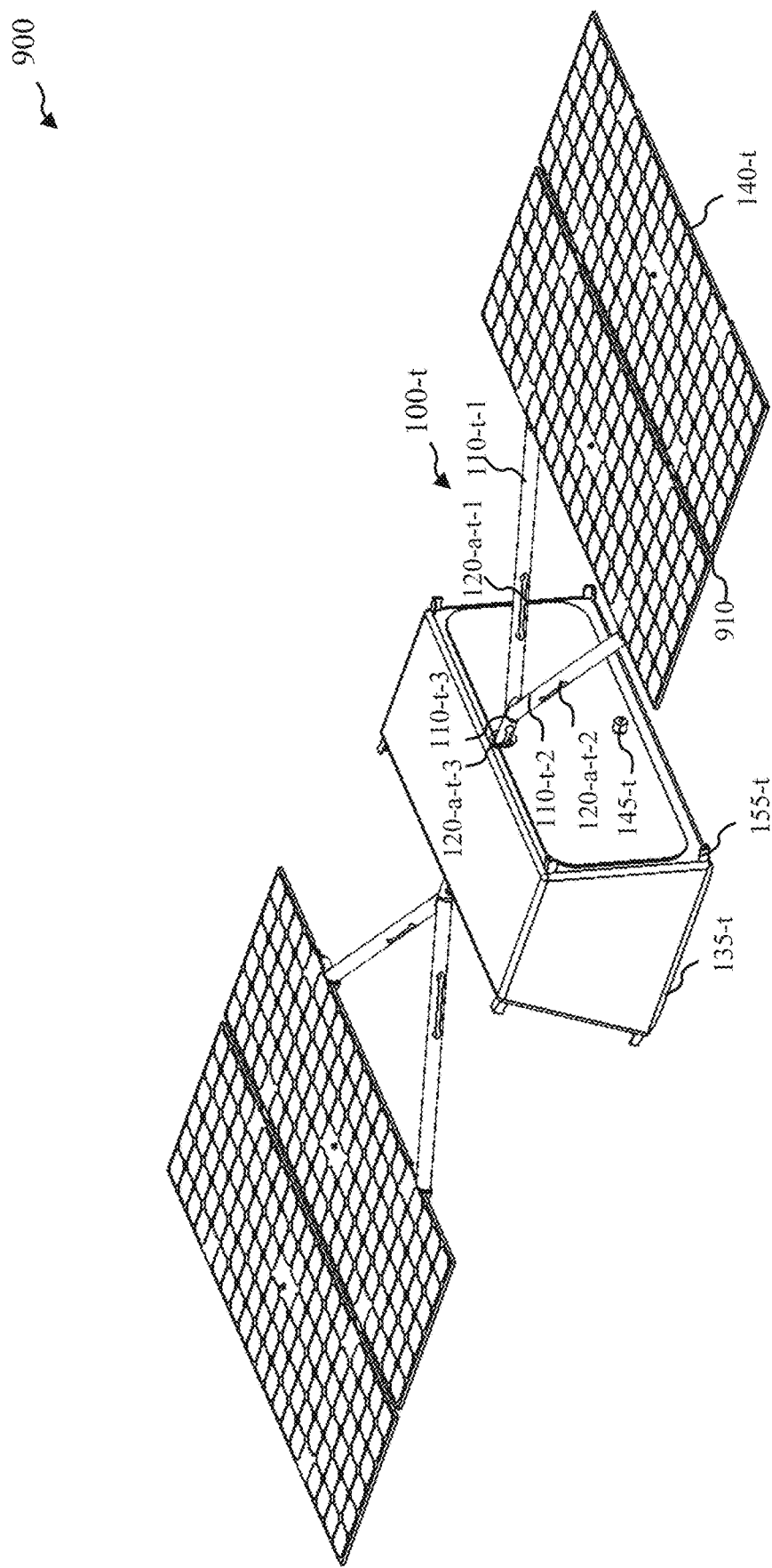
FIG. 9 shows a system in accordance with various embodiments.

Turning now to FIG. 9, a system 900 in accordance with various embodiments is provided. System 900 may include aspects of the systems and/or devices of FIG. 1A, FIG. 1B, FIG. 1D, FIG. 1E, FIG. 2A, FIG. 2B, FIG. 2C, FIG. 2D, FIG. 2E, FIG. 2F, FIG. 4A, FIG. 4B, FIG. 4C, FIG. 4D, FIG. 4E, FIG. 4F, FIG. 4G, FIG. 4H, FIG. 5, FIG. 7A, FIG. 7B, FIG. 7C, FIG. 7D, and/or FIG. 8. System 900 may be an example of the use of foldable tube sections with unitary hinge regions that may include device 100-t with a yoke configuration; the yoke configuration may include two arm portions 110-t-1, 110-t-2 and one base portion 110-t-3 as foldable tube sections. Each of the two arm portions 110-t-1, 110-t-2 may include one or more longitudinal unitary hinge regions 120-a-t-1, 120-a-t-2 and the base portion 110-t-3 includes one or more longitudinal unitary hinge regions 120-a-t-3 The two arm portions 110-t-1, 110-t-2 and the base portion 110-t-3 may be configured to avoid overlapping when the one or more hinges regions 120-a-t-1, 120-a-t-2 are folded. System 900 may show examples where the solar array panels 140-t may be hinged 910, which may allow for larger overall deployed panel size. The hinged aspect 910 may utilize a variety of components, including, but not limited to tape spring hinges. System 900 may also show satellite housing 135-t, HDRM 145-t, and/or snubber component(s) 155-t. System 900 may show two yoke configurations with solar panels, though only one set is called out.

Figure 10:
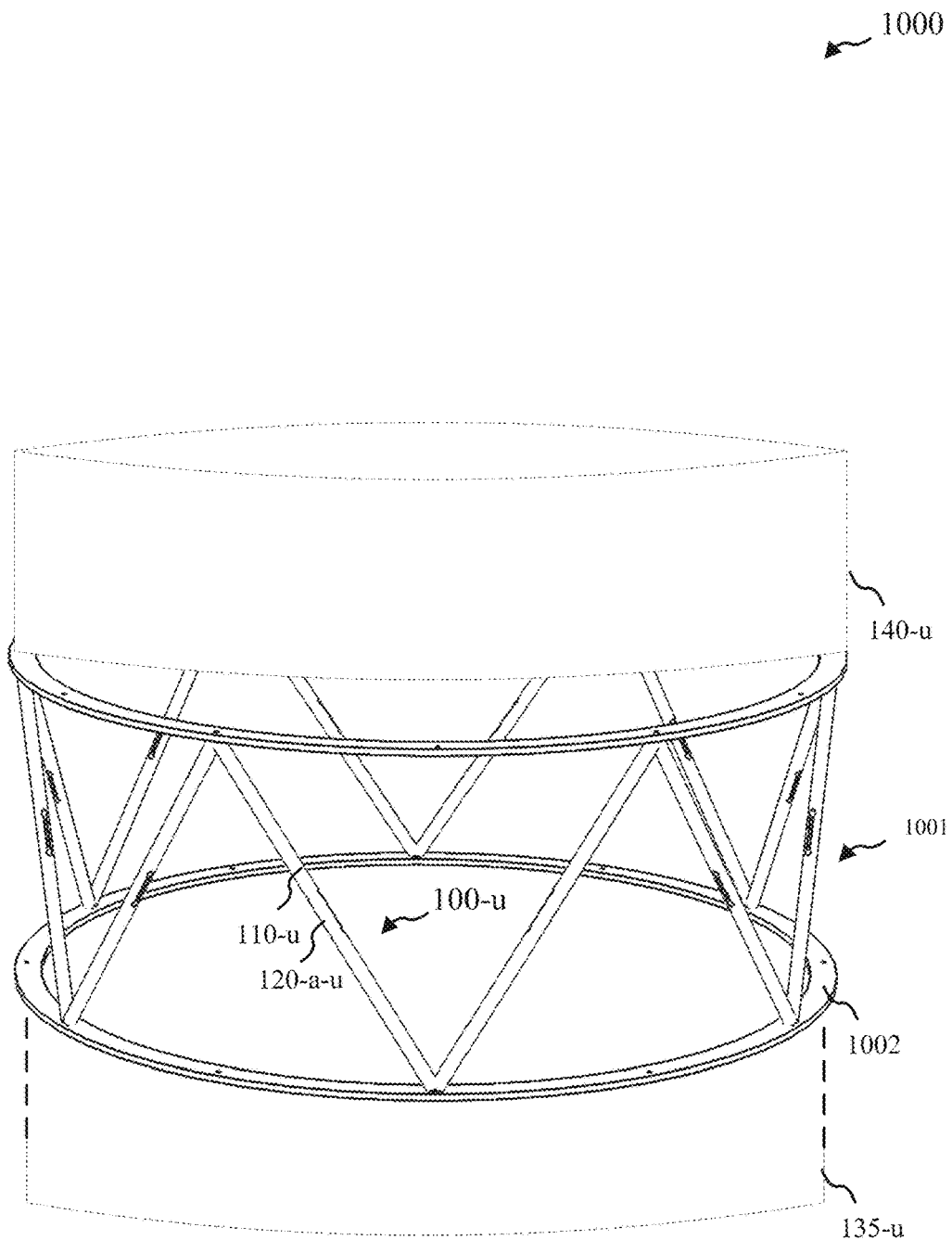
FIG. 10 shows a system in accordance with various embodiments.

FIG. 10 shows a system 1000 in accordance with various embodiments. System 1000 may include aspects of the systems and/or devices of FIG. 1A, FIG. 1B, FIG. 1C, FIG. 1E, FIG. 2A, FIG. 2B, FIG. 2C, FIG. 2D, FIG. 2E, FIG. 2F, FIG. 4A, FIG. 4B, FIG. 4C, FIG. 4D, FIG. 4E, FIG. 4F, FIG. 4G, FIG. and/or 4H. System 1000 may be an example of the use of multiple foldable tube sections with unitary hinge regions. In some embodiments, system 1000 may be configured with the multiple foldable tube sections with unitary hinge regions configured as a deployable strut isolator system. For example, the multiple strut isolators 1001, with one device 100-u called out with one or more flexible tube sections 110-u and one or more unitary hinge regions 120-a-u, separate a deployed object 140-u from another object 135-u, such as a spacecraft.

Merely by way of example, deployed object 140-u may include a cryogenic tank, while object 135-u may be s source of heat. The use of the multiple strut isolators 1001 may separate the deployed object 140-u and the heat source 135-u, thereby increasing the thermal isolation. The elements of isolator may create a high resistance thermal circuit because they may be out of the load path for launch loads and may only experience the 2-3 orders of magnitude smaller on-orbit ACS loads. In some embodiments, the isolator elements 1001 may be fabricated from highly insulating quartz fiber reinforced polymer composite material to form high strain composite structures, though other materials such as graphite or Kevlar fibers may be utilized. The arrangement of a ring configuration 1002 with multiple V-shaped strut isolators 1001 may introduce both out of plane folding of the struts (v-shaped folded geometry) in the stowed condition and a critical-tolerancing risk, where a length mismatch could prevent deployment completion of struts.

Turning now to FIG. 11A, a flow diagram of a method 1100 is shown in accordance with various embodiments. Method 1100 may be implemented utilizing a variety of systems and/or devices such as those shown and/or described with respect to FIG. 1A, FIG. 1B, FIG. 1C, FIG. 1D, FIG. 1E, FIG. 2A, FIG. 2B, FIG. 2C, FIG. 2D, FIG. 2E, FIG. 2F, FIG. 3A, FIG. 3B, FIG. 3C, FIG. 3D, FIG. 3E, FIG. 4A, FIG. 4B, FIG. 4C, FIG. 4D, FIG. 4E, FIG. 4F, FIG. 4G, FIG. 4H, FIG. 5, FIG. 6, FIG. 7A, FIG. 7B, FIG. 7C, FIG. 7D, FIG. 8, FIG. 9, and/or FIG. 10. In FIG. 11A, the specific selection of steps shown and the order in which they are shown is intended merely to be illustrative. It is possible for certain steps to be performed in alternative orders, for certain steps to be omitted, and for certain additional steps to be added according to different embodiments. Some but not all of these variants are noted in the description that follows.

At block 1110, one or more foldable tube sections may be folded with respect to one or more longitudinal unitary hinge regions of the one or more foldable tube sections to stow the one or more foldable tube sections; the one or more foldable tube sections may be configured to facilitate the deployment of an object with respect to an end portion of at least one of the one or more foldable tube sections.

Some embodiments of method 110 include compressing the one or more foldable tube sections with respect to one or more longitudinal portions of the one or more foldable tube sections to further stow the one or more foldable tube sections. Some embodiments include deploying the one or more foldable tube sections through decompressing the one or more compressed longitudinal portions of the one or more foldable tube sections and unfolding the one or more foldable tube sections with respect to the one or more longitudinal unitary hinge regions.

In some embodiments of method 1100, at least folding or compressing the one or more foldable tube sections stacks the one or more longitudinal portions of the one or more foldable tube sections. In some embodiments, folding the one or more foldable tube sections avoids overlapping one or more longitudinal portions of the one or more foldable tube sections. In some embodiments, compressing the one or more foldable tube sections provides a kickoff spring functionality for deploying the one or more foldable tube sections. In some embodiments, compressing the one or more foldable tube sections includes flattening the one or more foldable tube sections with respect to one or more lateral unitary hinge regions. In some embodiments, deploying the one or more foldable tube sections includes deploying the object coupled with the end portion of at least one of the one or more foldable tube sections.

Some embodiments of method 1100 include utilizing one or more relief slots of a respective longitudinal unitary hinge region to allow for over rotation of the longitudinal unitary hinge region during deployment. Some embodiments include utilizing one or more circumferential bands proximal to at least one of the one or more longitudinal unitary hinge regions.

Some embodiments of method 1100 include utilizing a wire harness disposed within an interior portion of at least one of the one or more foldable tube sections. Some embodiments include constraining one or more portions of the one or more tube sections during at least the folding or the compressing utilizing one or more saddle components.

In some embodiments of the method 1100, the one or more foldable tube sections include a composite material with multiple layers; the multiple layers may include one or more carbon fiber layers. In some embodiments, the one or more longitudinal unitary hinge regions include two or more apertures configured to allow the respective foldable tube section to fold and to flatten at least a portion of the respective longitudinal unitary hinge region. In some embodiments, the one or more lateral unitary hinge regions include one or more layers devoid of carbon fibers. In some embodiments, the one or more relief slots allow the longitudinal hinge region to self-buckle. In some embodiments, the wire harness includes one or more reduced regions configured to coincide with one or more of the longitudinal unitary hinge regions. In some embodiments, the wire harness is configured to at least fold or flex laterally in a region of the one or more foldable tube sections other than the one or more longitudinal unitary hinge regions. In some embodiments, the wire harness includes one or more relief slots. In some embodiments, the deployed object includes one or more solar panels coupled with at least one of the one or more foldable tube sections utilizing at least one of the one or more tube interfaces.

Figure 11B:
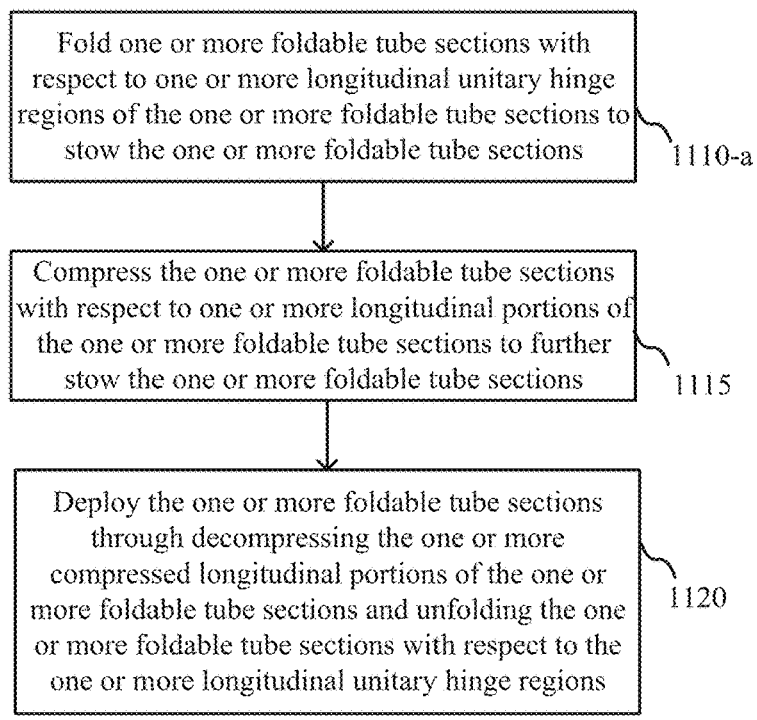
FIG. 11B shows a flow diagram of a method in accordance with various embodiments.

FIG. 11B shows a flow diagram of a method 1100-*a* in accordance with various embodiments. Method 1100-*a* may be implemented utilizing a variety of systems and/or devices such as those shown and/or described with respect to FIG. 1A, FIG. 1B, FIG. 1C, FIG. 1D, FIG. 1E, FIG. 2A, FIG. 2B, FIG. 2C, FIG. 2D, FIG. 2E, FIG. 2F, FIG. 3A, FIG. 3B, FIG. 3C, FIG. 3D, FIG. 3E, FIG. 4A, FIG. 4B, FIG. 4C, FIG. 4D, FIG. 4E, FIG. 4F, FIG. 4G, FIG. 4H, FIG. 5, FIG. 6, FIG. 7A, FIG. 7B, FIG. 7C, FIG. 7, FIG. 8, FIG. 9, and/or FIG. 10. In FIG. 11B, the specific selection of steps shown and the order in which they are shown is intended merely to be illustrative. It is possible for certain steps to be performed in alternative orders, for certain steps to be omitted, and for certain additional steps to be added according to different embodiments. Some but not all of these variants are noted in the description that follows. Method 1100-*a* may be an example of method 1100 of FIG. 11A.

At block 1100-*a*, one or more foldable tube sections may be folded with respect to one or more longitudinal unitary hinge regions of the one or more foldable tube sections to stow the one or more foldable tube sections. At block 1115, the one or more foldable tube sections may be compressed with respect to one or more longitudinal portions of the one or more foldable tube sections to further stow the one or more foldable tube sections. At block 1120, the one or more foldable tube sections may be deployed through decompressing the one or more compressed longitudinal portions of the one or more foldable tube sections and unfolding the one or more foldable tube sections with respect to the one or more longitudinal unitary hinge regions.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A device comprising:
    one or more foldable tube sections configured to facilitate the deployment of an object with respect to an end portion of at least one of the one or more foldable tube sections, wherein:
    each of the one or more foldable tube sections includes one or more unitary hinge regions;
    the one or more foldable tube sections include a composite material with a plurality of layers, wherein the plurality of layers includes one or more carbon fiber layers;
    at least one of the unitary hinge regions includes a longitudinal hinge region configured to enable folding that is transverse to a primary axis of a respective foldable tube section; and
    at least one of the unitary hinge regions includes a lateral hinge region configured to enable flattening that is parallel to a primary axis of a respective foldable tube section such that the lateral hinge region includes one or more layers devoid of carbon fibers that extend along a length of the respective foldable tube segment outside of the longitudinal hinge region.

2. The device of claim 1, wherein the longitudinal hinge region includes at least a portion of the one or more carbon fiber layers.

3. The device of claim 1, further comprising one or more circumferential bands proximal to the longitudinal hinge region.

4. The device of claim 3, wherein the one or more circumferential bands are formed from one or more composite material layers.

5. The device of claim 1, wherein the longitudinal hinge region includes two or more apertures configured to allow the respective foldable tube section to fold and to flatten at least a portion of the longitudinal hinge region.

6. The device of claim 1, wherein the longitudinal hinge region includes one or more relief slots oriented around a circumference of a respective foldable tube section.

7. The device of claim 6, wherein the one or more relief slots allow the longitudinal hinge region to self-buckle.

8. The device of claim 1, further comprising a wire harness disposed within an interior portion of at least one of the one or more foldable tube sections.

9. The device of claim 8, wherein the wire harness includes one or more necked down regions configured to coincide with one or more of the respective longitudinal hinge regions.

10. The device of claim 8, wherein the wire harness is configured to at least fold or flex laterally in a region of the one or more foldable tube sections other than the longitudinal hinge region.

11. The device of claim 8, wherein the wire harness includes one or more relief slots.

12. The device of claim 1, wherein a first foldable tube section from the one or more foldable tube sections is configured to stack with a second foldable tube section from the one or more foldable tube sections when at least one of the one or more unitary hinge regions is folded and the first foldable tube section and the second foldable tube section are compressed.

13. The device of claim 1, wherein the one or more foldable tube sections are fabricated to compress to provide a kickoff spring functionality for deployment of the one or more foldable tube sections.

14. The device of claim 1, further comprising one or more tube interfaces coupled with one or more end portions of at least one of the one or more foldable tube sections.

15. The device of claim 14, wherein the object includes one or more solar panels coupled with at least one of the one or more foldable tube sections utilizing at least one of the one or more tube interfaces.

16. The device of claim 1, further comprising one or more saddle components configured to constrain at least one of the one or more foldable tube sections during at least a folding or a compressing of the one or more foldable tube sections.

17. The device of claim 1, wherein the one or more carbon fiber layers include a first carbon fiber layer that extends around a first portion of the respective foldable tube segment and a second carbon fiber layer that extends around a second portion of the respective foldable tube segment such that the one or more layers devoid of carbon fibers extend between a gap separating the first portion of the respective foldable tube segment and the second portion of the respective foldable tube segment.

18. The device of claim 17, wherein the one or more layers devoid of carbon fibers include one or more fiberglass layers.

* * * * *